United States Patent [19]
Voit et al.

[11] Patent Number: 6,157,648
[45] Date of Patent: Dec. 5, 2000

[54] NETWORK SESSION MANAGEMENT

[75] Inventors: Eric A. Voit, Baltimore; Edward E. Balkovich, Potomac, both of Md.; Robert D. Farris, Sterling, Va.; William D. Goodman, Collegeville, Pa.; Jayant G. Gadre, Oakton; Patrick E. White, Vienna, both of Va.; David E. Young, Silver Spring, Md.

[73] Assignee: Bell Atlantic Network Services, Inc., Arlington, Va.

[21] Appl. No.: 08/931,477

[22] Filed: Sep. 16, 1997

Related U.S. Application Data

[63] Continuation-in-part of application No. 08/812,075, Mar. 6, 1997.

[51] Int. Cl.[7] .................................................. H04L 12/66
[52] U.S. Cl. ........................ 370/401; 370/354; 379/88.17
[58] Field of Search ................................... 370/408, 401, 370/351, 352, 354, 355; 379/88.22, 88.17; 395/200.79

[56] References Cited

U.S. PATENT DOCUMENTS

| | | | |
|---|---|---|---|
| 4,916,691 | 4/1990 | Goodman | 370/389 |
| 5,247,571 | 9/1993 | Kay et al. | |
| 5,590,133 | 12/1996 | Billström et al. | 370/349 |
| 5,608,786 | 3/1997 | Gordon | |
| 5,661,790 | 8/1997 | Hsu | 379/209 |
| 5,724,355 | 3/1998 | Bruno et al. | |
| 5,726,984 | 3/1998 | Kubler et al. | |
| 5,751,961 | 5/1998 | Smyk | 709/217 |
| 5,793,762 | 8/1998 | Penners et al. | 370/389 |
| 5,838,682 | 11/1998 | Dekelbaum et al. | 370/401 |
| 5,850,433 | 12/1998 | Rondeau | 379/201 |
| 5,867,495 | 2/1999 | Elliott et al. | 370/352 |
| 5,883,891 | 3/1999 | Williams et al. | 370/356 |
| 5,889,774 | 3/1999 | Mirashrafi et al. | 370/352 |
| 5,910,946 | 6/1999 | Csapo | 370/328 |
| 5,915,001 | 6/1999 | Uppaluru | 379/88.22 |
| 5,923,659 | 7/1999 | Curry et al. | 370/401 |
| 5,940,598 | 8/1999 | Strauss et al. | 395/200.79 |
| 5,974,043 | 10/1999 | Solomon | 370/352 |
| 6,005,926 | 12/1999 | Mashinsky | 379/114 |

OTHER PUBLICATIONS

Yang. C. INETPhone: Telephone Services and Severs on Internet. http://ds.internic.net/rfc/rfc1789.txt (Feb. 12, 1997).

Primary Examiner—Hassan Kizou
Assistant Examiner—John Pezzlo
Attorney, Agent, or Firm—McDermott, Will & Emery

[57] ABSTRACT

A communication system providing telephony communication across combined circuit switched and packet switched networks, such as a telephone network and the Internet, which are connectable to terminals, such as telephones and computers, for selective communication therebetween. The communication system includes a directory object in the packet switched network, multiple gateways between the circuit switched and packet switched networks providing controlled connectivity between those networks, and an interface between the directory object and the gateways. The directory object is preferably provided in hierarchical architecture as a unitary logical object having distributed instances. In addition to the customary address translation capability the directory object polls or communicates with the gateways through the additional interface and provides an intelligent routing function. The directory object is of an enhanced type with access to a storage of customer routing and handling selections. It includes routing algorithms for determining best routing based on customer prescribed parameters, and also based on provider parameters in the absence of customer preferences. Reservability of communication paths and/or bandwidth may be provided. The system architecture and methodology permits provision of specified bandwidth either on a subscribed basis or on point of call demand. Terminal to terminal communication paths of specified parameters may be reserved in advance.

38 Claims, 22 Drawing Sheets

| Destination | Destination Node | Source | Source Node | Reserved Bandwidth |
|---|---|---|---|---|
| ITG 210 | R-1 | PC 628 | R-10 | OC-1 |
| ITG 624 | R-12 | PC 628 | R-10 | OC-1 |
| ITG 620 | r-11 | PC 628 | R-10 | OC-1 |
| Directory | R-5 | ITG 620 | R-11 | OC-3 |
| Directory | R-5 | ITG 210 | R-1 | OC-3 |
| Directory | R-5 | ITG 624 | R-12 | OC-3 |
| | | | | |
| | | | | |

FIG. 19

NETWORK SESSION MANAGEMENT

This application is a continuation-in-part of Eric A. Voit application Ser. No. 08/812,075, entitled Enhanced Internet Domain Name Server, filed Mar. 6, 1997, and assigned to the assignee of the instant application. This application is related to Eric A. Voit et al application Ser. Nos. 08/931,159, 08/931,480 and 08/931,268 all entitled NETWORK SESSION MANAGEMENT, and all filed on Sep. 16, 1997 and assigned to the assignee of the instant application. This application also is related to Currey, et al. application Ser. No. 08/768,460, entitled Internet Long Distance Telephone Service, filed Dec. 12, 1996, and assigned to the assignee of the instant application. Those applications are incorporated herein by reference in their entirety.

FIELD OF INVENTION

This invention relates to methods and systems for managing signaling and communication sessions across networks, and particularly relates to a scalable methodology and system for managing telephony over hybrid networks such as combined switched telephone networks and packet switched internetworks, such as the Internet.

BACKGROUND OF THE INVENTION

Attention recently h as been directed to implementing a variety of communication services, including voice telephone service, over the worldwide packet data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP. The TCP/IP protocols were originally developed for use only through ARPANET but have subsequently become widely used in the industry. TCP/IP is flexible and robust. TCP takes care of the integrity, and IP moves the data.

Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

FIG. 3 shows a simplified diagram of the Internet and various types of systems which are typically connected. Generally speaking the Internet consists of Autonomous Systems (AS) type packet data networks which may be owned and operated by Internet Service Providers (ISPs) such as PSI, UUNET, MCI, SPRINT, etc. Three such AS/ISPs appear in FIG. 3 at 310, 312 and 314. The Autonomous Systems (ASs) are linked by Inter-AS Connections 311, 313 and 315. Information Providers (IPs) 316 and 318, such as America Online (AOL) and CompuServe, connect to the Internet via high speed lines 320 and 322, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, SPRINT is an ISP, and the Microsoft Network (MSN) is an IP using UUNET as an ISP. Other information providers, such as universities, are indicated in exemplary fashion at 324 and are connected to the AS/ISPs via the same type connections here illustrated as T1 lines 326. Corporate Local Area Networks (LANs), such as those illustrated in 328 and 330, are connected through routers 332 and 334 and high speed data links such as T1 lines 336 and 338. Laptop computers 340 and 342 are representative of computers connected to the Internet via the public switched telephone network (PSTN), and are shown connected to the AS/ISPs via dial up links 344 and 346.

In the addressing scheme of the Internet, an address comprises four numbers separated by dots. This is called the Internet Protocol address, or IP address. An example of an IP address would be 164.109.211.237. Each machine on the Internet has a unique number assigned to it which constitutes one of these four numbers. In the IP address, the leftmost number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router.

When a packet bearing a destination address leaves the source router, the router examines the first two numbers in a matrix table to determine how many hops are the minimum to get to the destination. It then sends the packet to the next router as determined from that table, and the procedure is repeated. Each router has a database table that finds the information automatically. This continues until the packet arrives at the destination computer. The separate packets that constitute a message may not travel the same path depending on traffic load. However, they all reach the same destination and are assembled in their original order in a connectionless fashion. This is in contrast to connection oriented routing modes, such as frame relay and ATM or voice.

It would be difficult for most people to remember the four separate numbers (sometimes having ten or more digits) comprising each numeric IP address. In addition numeric IP addresses occasionally change, making it even more of a problem for people to keep track of them. The Domain Name System (DNS) was developed to provide some relief from these problems. In the DNS system words, which are more easily remembered, are used instead of numbers.

An example of a textual Domain Name is Evoit@HUT.MB.COM. Each of the names separated by a dot is called a domain. The significance of each of the domains is the reverse of that of the numeric IP address. In the numeric IP address, the most significant numbers were on the left and the least significant on the right. The textual Domain Name System begins with the least significant on the left and proceeds to the most significant on the right.

The top-level domains, those of the most general significance, are as follows:

1. COM A commercial operation
2. EDU A university, college or other education institution
3. GOV A government organization
4. MIL A military site
5. ORG Any organization that does not fit into any of the preceding
6. NET A network There are now two-letter domains, each denoting a different country, which are atop the above original domain names. An address ending in "COM.AU," for example, would be a commercial operation in Australia. Over a hundred different countries are now connected to the Internet so the list of two-letter country codes is ever increasing. Computers associated with the Internet called domain name servers convert textual domain names into numeric IP addresses.

Recently, one or more companies have developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

Such programs have relied on servers coupled to the Internet to establish voice communication links through the networks. Each person active on the network, who is willing to accept a voice call, must register with a server. A calling party can call only those persons registered on the voice communication server. Also, the address management provided by these servers, like that provided by the domain name servers, has not permitted any individualized control of routing. For example, a user could register only one current address and must reregister each time the user comes on-line with a new address. The registration server provides no automatic selection of alternate destinations.

Concurrent with recent developments in public packet data communications such as the Internet, outlined above, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". For ordinary telephone service calls, there would be not event to trigger AIN processing. The local and toll office switches would function normally and process such calls without referring to the central database for instructions. An office which detects a trigger will suspend call processing, compile a call data message and forward that message via a common channel interoffice signaling (CCIS) link to a database system, such as an Integrated Service Control Point (ISCP). Each ISCP includes a Multi-Services Application Platform (MSAP) database.

If needed, an ISCP can instruct the central office to obtain and forward additional information. Once sufficient information about the call has reached the ISCP, the ISCP accesses its stored data tables in the MSAP database. Using those tables it translates the received message data into a call control message and returns the call control message to the switching office of the network via CCIS link. The network switching offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

As shown by the art discussed above, the Internet and the AIN have remained separate, independent areas of technical development. Many telephone service subscribers are accustomed to enhanced telephone features, such as those provided by AIN processing. However, the wide range of conditional routing options offered by AIN type processing have not been available on the Internet. For example, the address processing provided by the domain name servers and the registration servers used to exchange addresses for voice communication have not permitted alternate treatments for different times, different calling parties, different destinations of roaming subscribers, etc. An enhanced domain name server which enables conditional routing and which is capable of wide database applications was disclosed and described in detail in the above-referenced parent Eric A. Voit U.S. application Ser. No. 08/812,075.

As use of the Internet expands, particularly for transport of voice telephone communications, a need exists not only for enhanced address management but also for distributed and scalable customer account authentication, authorization, usage recording, usage pricing billing account management, and inter carrier interfaces. The enhanced domain server described in the above incorporated Voit application Ser. No. 08/812,075 lends itself to serving in this capacity.

Voice over internetworks, and particularly the Internet (V/IP), involves terminal equipment affiliated with various networks. V/IP services can be divided into at least four categories based on the type of network to which the users' terminal equipment is attached, such as Internet/Intranet or narrowband Public Switched Telephone Network (PSTN) or POTS (plain old telephone service) telephone network. These four categories are:

1. Personal Computer (PC)—PC
2. PC—Telephone
3. Telephone—PC
4. Telephone—Telephone Existing V/IP implementations over the Internet are subject to best-effort quality of service (QoS). Typically, this is noticeably degraded as compared to "toll quality" service. In addition, it is subject ot significant variations. There is a need for improvement over these existing implementations both in level and consistency of QoS. The QoS should be such as to be perceived by end users as consistently supporting comfortable conversation similar to that which users are accustomed. Preferably the QoS should be equivalent to "toll quality" voice service.

Residential and business customers on the PSTN are accustomed to the availability of enhanced calling features and it is desirable to provide personal dialing directories, ability to use multiple point to point connections at the same time, multi-line conferencing capabilities, and full duplex operation. Authorization and security features should be supplied, as well as user access to billing and usage accounting relating to their own accounts.

In addition to the foregoing developers of Internet telephony systems have encountered a variety of call set-up and routing issues in selection of the appropriate PSTN hop-off Internet Telephony Gateway (ITG) under a variety of ITG deployment scenarios.

While attempts are being made to develop an initial set of Internet Telephony Gateway (ITG) service architectures, to date no solution is presently known to exist to effectively cope with hop-off ITG selection when multiple ITGs are available for use. When multiple ITGs are available many factors bear upon the decision as to the most appropriate choice. These factors include:

Least Cost Routing

Which ITG selection will result in the lowest cost call for the customer (based on available tariff information).

Which ITG selection will result in the lowest cost rate for the carrier attempting to terminate the call for the customer (in essence, a carrier will be shopping for the highest margin between what the customer is paying the carrier, and what the carrier must pay to other carriers it involves in the call).

Which ITG selection will result in the shortest or least expensive packet switched network route for a carrier.

Which ITG selection will result in the shortest or least expensive circuit switched network route for a carrier.

Which ITG selection will result in the shortest or least expensive total combined circuit switched and packet switched network route for a carrier.

Resolving Geographical Boundaries

How to distribute calls between ITGs when several ITGs owned by different carriers serve the same hop-off calling area.

How to select the optimal ITG when several ITGs (which have different but overlapping calling areas) serve the same targeted called party.

Available PSTN Interface Resources

How to query for available (non-busy) ports across multiple Internet Telephony Gateway (ITG) systems. How to select the optimal ITG system based on responses from those systems.

How to reserve resources (via out of band signaling or otherwise) within an ITG and/or through an IP network, send the reservation to the user system which contacted the directory, and let the user system set-up a session with the ITG based on the reservation number.

Combinations of the Above Options

How to implement a decision matrix which helps to trade off issues regarding tariff rates, network efficiency in routing, quality of service of links, hop-off gateway carrier selection, and available ITG resources when selecting the "best" choice for a hop-off ITG.

DISCLOSURE OF THE INVENTION

It is a primary objective of the present invention to respond to a maximum number of the needs which have been described.

The present invention addresses those needs by providing a robust and scalable customer account management database within the packet switched network. This database may act as manager of all transactions for a particular customer account. Each Internet telephone service subscriber will have at least one billing and authorization account maintained in a database on the Internet. During set-up of a call, the hop-off gateway will obtain identification and password information from the caller. The gateway then communicates with the database to determine if the call is authorized and to negotiate the overall billing algorithm. When the call is finished, the gateway will report usage data to the database for billing purposes.

Another objective is to provide an overall internetwork architecture that will permit the development of Internet Telephony Gateways (ITGs) capable of dealing with existing problems on a scalable basis. For example, in view of the fact that there is no "originating switch" to generate billing records for an internetwork caller, there is no present system for providing a generation site which will implement a unitary presentation of customer account usage, and also support extraction of data from the network on a real time basis. There is no present architecture or methodology to provide for customer access to his/her account or accounts records without intermixing requests for account information with requests for implementing services. Such an intermixing would subject the fulfillment of services to the traffic load of information requests and vice versa. There is no present architecture for ensuring customer authentication and billing beyond a limited number of customers.

It is another objective of the invention to implement a system to inform a customer of the pricing rules for a call prior to call connection and to report the price of the call in real time visually or orally.

It is another objective of the invention to provide customers with ready access to information in their account records without allowing the customers to access the account database which is used in implementing services, or updating or maintaining or storing such databases.

It is yet another objective of the invention to provide a system to implement the handling of multiple, concurrent calls terminating at different ITGs using the same billing account number and preventing overrun of a preset account spending limit.

It is another object of the invention to provide an architecture which will provide downloading of billing data to external service providers in isolation from the account information maintained and utilized in implementing Internet voice telephony.

It is a still further objective of the invention to ensure that such a system will operate properly in situations where the ITG is owned by a different company than the owner of the customer account.

It is another objective of the invention to provide a mechanism for reducing the potential for fraud.

According to the invention usage recording, pricing, and authorization are bundled into one logical object. This eliminates the separation between authorization and billing processes and significantly reduces the potential for fraud in a regionally deployed system. By having a single logical database which is managing customer authentication, authorization, and usage pricing for the overall network, a transaction-based approach to updating data is possible. This minimizes opportunities for fraud based on exploitation of temporary inconsistencies of partitioned or replicated data bases. There is no requirement that this logical object be implemented as a single physical system.

The single logical element or object is invoked during a call when an authorization request is received. This request may consist of an account number and password provided by a PC suer to be authenticated. At this point the logical database processor checks the account password and available account balance. If the password is correct and the remaining balance in the account permits the call to be established, the object responds affirmatively to the Internet Telephony Network (ITN) Call Control Object which includes the Internet Telephony Gateway (ITG). The database retains data indicating that a call associated with that account is in progress. In such an architecture mutual authentication by the Call Control Object and ITG and the database is preferable, as is a secure (such as by encryption) call transaction between them.

In providing the authorization, the database object will evaluate the customer account status to determine if there are multiple connections currently in service, possibly across multiple ITGs. With this state information, the authorization function of the system may ensure that only one call per account is being handled by the network, and/or ensure that the maximum billing limit is not being circumvented by multiple concurrent sessions. In the absence of such a precaution, a second PC caller using the same account and password might receive authorization for a call prior to the posting of the first caller's usage record. Optionally, in order to handle low billing amount availability without denying a call completely, the database object may respond to the ITN with a maximum allowable call duration.

Another feature is that the database object may reserve a predetermined remaining balance on the account for the call so that additional calls related to that account will not result in exceeding the account's limit. The database object may return the pricing algorithm for the usage to the Call Control Object and ITG, which will pass it on to the PC user. In this way the PC user knows the initial charge and ongoing per minute rate for the usage. This is particularly important when the Call Control Object and ITG is owned by a different company than the database object. The user desires to know the rates that will be charged prior to completing the call. The PC is such as to be able to receive and utilize the algorithm, and display pricing to the PC user. The PC may also present the total charge being incurred by the user on a real time basis as the call progresses.

After the completion of the call, the database object is also responsible for accepting usage recording data which has been generated by the Call Control Object and ITG, pricing the usage, and decrementing that priced amount from a customer's available balance. The database object then logs the final call data. Preferably the Call Control Object and ITG also logs and maintains the call detail information. This feature is very useful in the situation where the Call Control Object and ITG and the database objects are owned by different companies. In this case, the data base object data can be used by the owner of the database object to manage the customer account. In addition, the Call Control Object and ITG data can be used by the owner of the Call Control Object and ITG to charge the database object for the completion of the call over its facilities. In effect this Call Control Object and ITG data becomes the basis for a usage based settlement interface between carriers.

Preferably the database object is partitioned and may be distributed. A database object partition may be made by a field identifying the carrier owning the customer account, a sub-field within the customer account number (such as NPA-NXX), the customer's telephone number, the customer's e-mail domain name, the customer's originating IP address, or some other field. Each partitioned database may then be placed on its own physical system. With such a partitioned customer account data architecture, it becomes possible to divide the totality of all managed accounts into implementable sub-groups in a straight forward manner.

It is an objective of the invention to provide a code based means of querying a distributed database of codes which allows automatic accessing of the pertinent physical instance of the database for approval.

It is another objective of the invention to provide such a database and functionality on a scalable basis.

It is another objective of the invention to provide a system for implementing an architecture, a set of defined interfaces, and a call flow for selecting an optimal hop-off gateway for providing Internet telephony services.

It is another objective of the invention to provide a system for implementing an architecture, a set of defined interfaces, and a call flow for providing reservable resources with varying characteristics selectable by the subscriber and/or user of the system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 19 is a diagram illustrating typically stored virtual paths in the directory object of FIG. 18.

BEST MODE FOR CARRYING OUT THE INVENTION

Figure 1A:
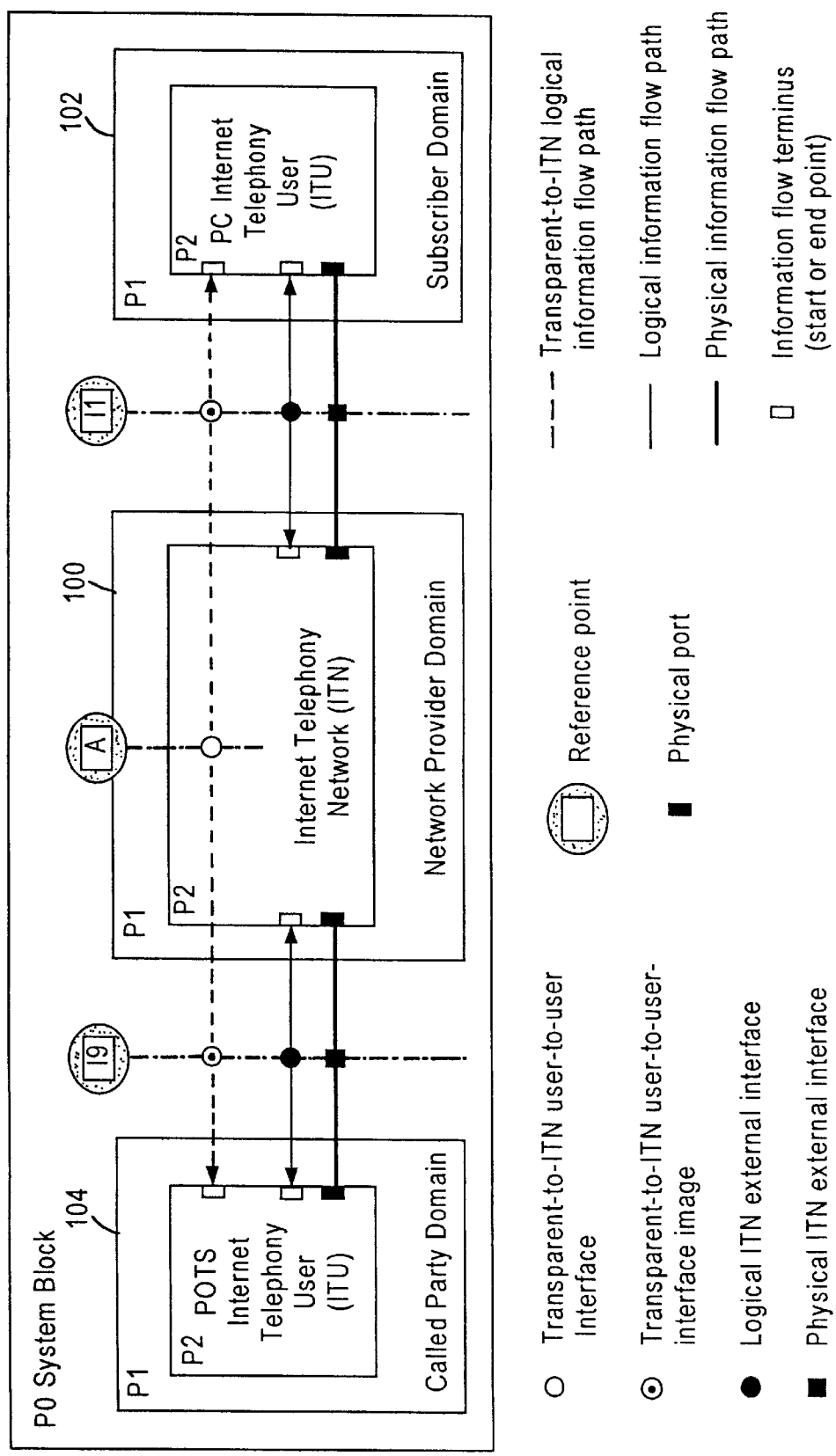
FIG. 1A is a high level (partition 1 level) diagram of a PC to Phone Internet Telephony architecture of one embodiment of the system of the invention.

Referring to FIG. 1A there is illustrated a high level (partition 1) reference model of the Internet Telephony Network or ITN. The center block 100 is the Internet Telephony Network or ITN, is shown in this illustration as managing a customer call between a PC and a POTS telephone. This ITN is in the Network Provider Domain and is responsible for all functions required of a traditional POTS network, i.e., call set-up, usage accounting, surveillance, etc. The ITN spans both the circuit switched network (such as Public Switched Telephone Network or PSTN) and the packet switched (Internet Protocol or IP - frame relay, etc.) networks. The PC Internet Telephony User (ITU or computer or PC user) is shown at 102 in the Subscriber Domain and the called POTS Internet Telephony User (ITU or telephone user) is shown at 104 in the Called Party Domain. The interface between the PC user and the ITN is designated I1, while the interface between the POTS user and the PSTN is designated I9. I9 represents a standard analog or digital telephone interface.

Figure 1B:
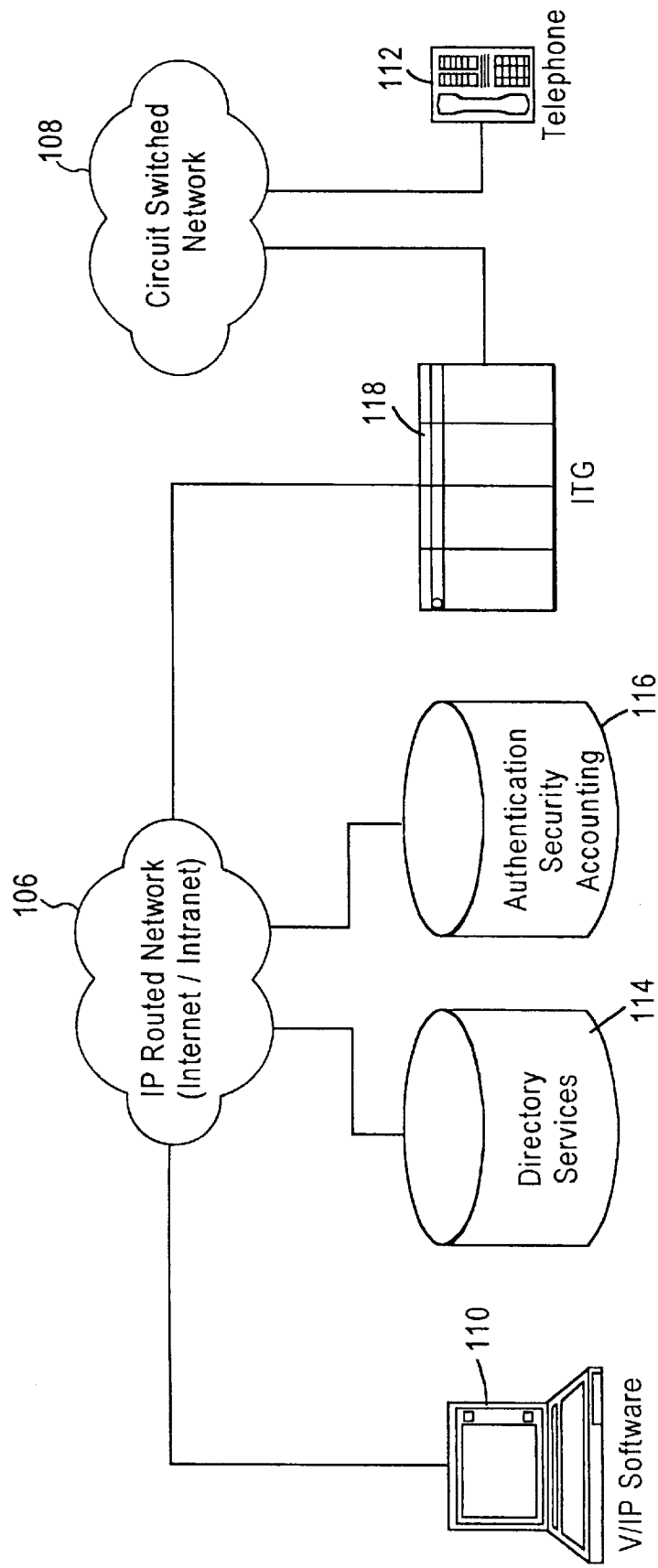
FIG. 1B is another simplified high level diagram of the generic system.

FIG. 1B shows a different high level depiction of the generic system wherein the packet switched and circuit switched networks are separately shown at 106 and 108. In this figure the end-to-end system connects a laptop computer 110 and a telephone 112. These constitute respectively the PC user call control object U1 and the U3 POTS U1 service user, as is presently described in further detail in relation to FIG. 2. The directory services object 114 and authentication and security accounting object 116 are coupled to the packet switched IP routed network 106. These constitute respectively the C1 ITN directory object and the C3 authorization, usage recording and pricing object, as presently described in further detail.

The Internet Telephony Gateway or ITG 118 connects the packet switched and circuit switched networks. This is sometimes referred to herein as the C2 ITN call control object. The computer may be linked to the packet switched network via any available computer to Internet link. Similarly the connection between the circuit switched network and the telephone may be any of the conventional links including POTS.

Figure 2:
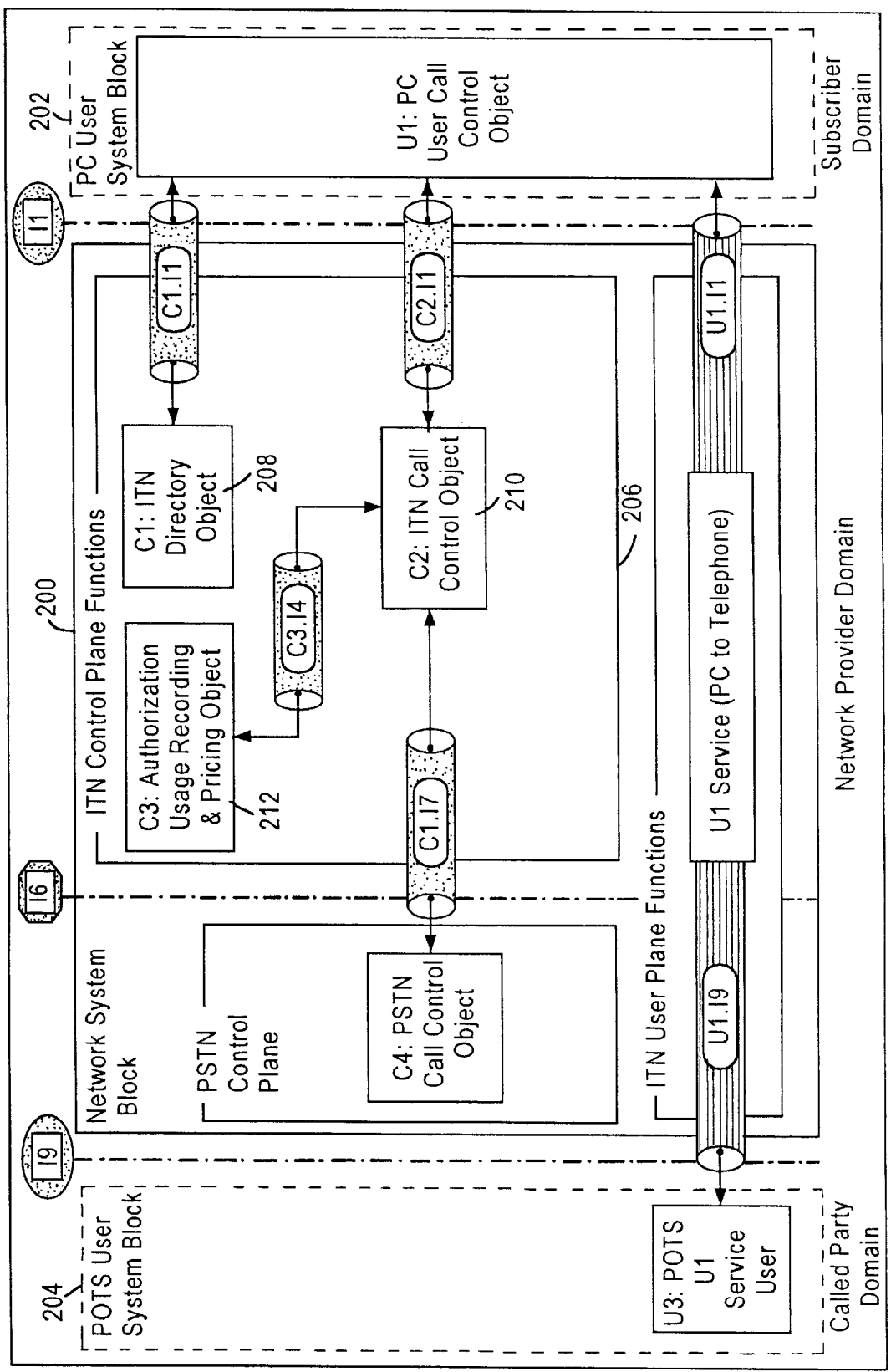
FIG. 2 is a diagram of one embodiment of a preferred architectural implementation showing interfaces between IP network elements.
Figure 3:
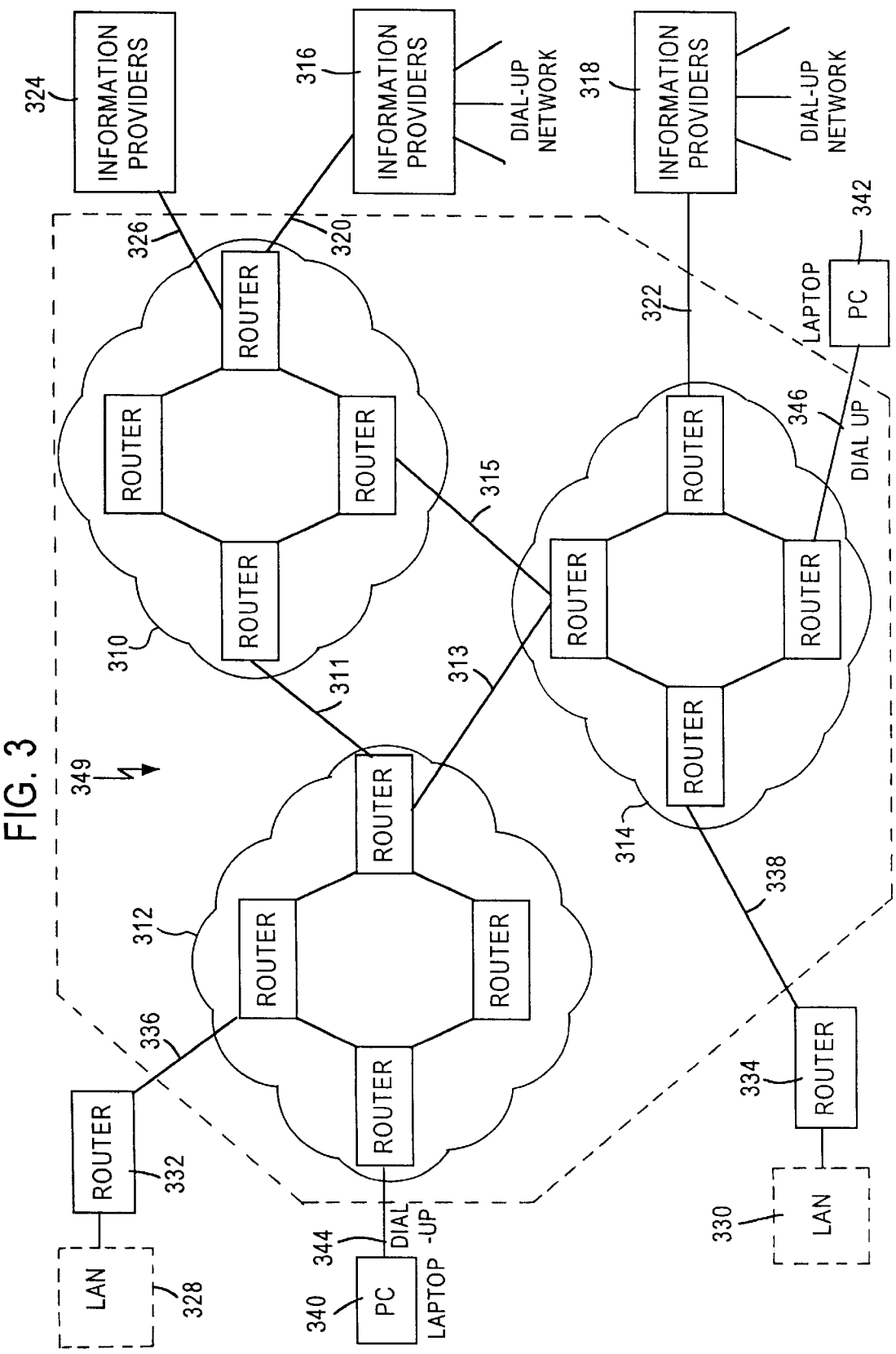
FIG. 3 shows a simplified diagram of the Internet and various types of systems typically connected thereto.

In order to manage a call across the circuit switched and packet switched networks, it is necessary to provide an architecture, a set of interfaces, and a call flow. FIG. 2 is a diagram showing the interfaces between IP network elements in one architectural implementation. Referring to that figure there is shown at 202 the PC user System Block in the subscriber domain, which includes the U1 PC User Call Control Object. At 200 there is shown the Network System Block or network provider domain, which includes the PSTN Control Plane and C4 PSTN Call Control Object. At 204 there is shown the POTS User System Block or called party domain, which includes the U3 POTS U1 Service User. Within the network System Block the ITN Control Plane functions are illustrated at 206. The ITN Control Plane functions are those which establish and teardown communication paths across the User Plane. Three Control Plane Objects are illustrated, namely:

C1: The Internet Telephony Gateway Directory Object

C2: The Internet Telephony Call Control Object

C3: The Internet Telephony Authorization and Usage Recording Object

These objects are shown respectively at 208, 210, and 212. Not shown in this figure is the PSTN Call Control Object C4 since neither the PSTN network elements nor the PSTN protocols are modified by the ITN system.

The C3 object represents the network element required in this architecture to perform customer authentication, call authorization, usage accounting, and usage pricing for a particular PC user's customer account. By bundling usage recording, pricing, and authorization into this one logical object, it is possible to eliminate the conventional separation between authorization and billing processes and significantly reduce the potential for fraud in a regionally deployed system. By having a single logical database which is managing customer authentication, authorization, and usage pricing for the network, a transaction-based approach to updating data is possible. This minimizes opportunities for fraud based on exploitation of the conventional temporary inconsistencies which are encountered with partitioned or replicated data bases. There is no requirement that this unitary logical object be implemented as a single physical system. Although not shown in FIG. 2, C3 can also respond to real time requests from external OSS systems for usage record details and account status information for the customer account.

The C3 object ensures coordination between User Authorization and Usage Recording for a single PC user's customer account. C3 also responds to external requests for that information.

According to the invention the C3 object is implemented in a manner such that multiple sites maintain their own database servers and no single site on the Internet is in possession of all of the authentication, authorization, usage pricing, and account data. The overall data constitutes a distributed database which forms a unitary logical object which relies on the database servers at the individual sites. Operation is such that a local C3 database or server receives a request for data. If the local server database cannot locate the requested information it sends a request to a second database serve asking it to locate the information and send the results back to the requester. The second database server locates the information and sends a message to the requester. If the second database server cannot locate the information in its database it (or the local server database) sends a similar request to the next database server until the desired information is located. Alternatively, the account number may be coded so as to indicate the proper database instance. Database servers with this capability are described in detail in the common assignee's copending Sistanizadeh application Ser. No. 08/634,544, filed Apr. 8, 1996. That application is incorporated by reference herein in its entirety.

The C3 object is invoked during a call when an Authorization request is relayed over the interface C3.I4. This interface is responsible for allowing an authorization of ITG usage by a service subscriber, and for maintaining the current state of a subscriber's connections within C3, as well as passing ITG generated usage records from C2 to C3 in real time. Communication through the C3.I4 interface is preferably encrypted and secure. The authorization request relayed over C3.I4 typically consists of an account number and password provided by the PC User to be authenticated by C3. At this point C3 checks the account password and available account balance. If the password is correct and the account remaining balance permits the call to be established, then C3 responds affirmatively to C2. C3 also retains data indicating that a call associated with that account is in progress. In such an architecture, mutual authentication of C2 and C3, and a secure transaction between them is preferred.

In providing the authorization, C3 evaluates the customer account status to determine is there are multiple connections currently in service (possibly across multiple ITGs). It should be appreciated that while FIG. 2 shows only a single gateway between a PC user and the ITN (via the PSTN), a plurality of gateways exist serving the various regional areas from which subscribers may request service. With the state information obtained from the C3 status evaluation the authorization system may ensure that only one call per account is being handled by the network, and/or ensure that the maximum billing limit is not being circumvented by multiple concurrent sessions. If this precaution is not provided a second PC caller using the same account and password might receive authorization for a call prior to the posting of the first caller's usage record. Optionally, in order to handle low billing amount availability without denying a call completely, C3 can respond to C2 with a maximum allowable call duration.

Another feature is that C3 may reserve a certain remaining balance on the account for the call so that additional calls related to that account will not result in exceeding that account's limit. C3 may return the pricing algorithm for the usage to C2 which will pass it on to the PC user. In this way the PC user knows the initial charge and ongoing per minute rate for the requested usage. This is particularly important when C2 is owned by a different company than C3, and the user wants to know the overall rates that will be charged prior to completing the call. The PC is such as to be able to receive and utilize the algorithm, and display pricing to the user. The PC is also able to present the total charge being incurred by the user as time goes on during the call.

After the completion of the call, the C3 object is also responsible for accepting usage recording data from C2, pricing the usage, and decrementing that priced amount from a customer's available balance. C3 then logs the final call data. Preferably C2 also logs and maintains the call detail information. This feature is very useful in the situation where C2 and the C3 database objects are owned by different companies. In this case, the database object data can be used by its owner to manage the customer account. In addition, the C2 data can be used by the owner of the C2 object to charge the C3 database object for the completion of the call over its facilities. In effect this C2 data becomes the basis for a usage based settlement interface between carriers.

Preferably the C3 system is partitioned. Such a partition may be made by a field identifying the carrier owning the customer account, a sub-field within the customer account number (such as NPA-NXX), the customer's telephone number, the customer's e-mail domain name, the customer's originating IP address, or some other field. Each partitioned database may then be placed on its own physical system on a geographical or other basis. With such a partitioned customer account data architecture, the domain of all managed accounts may be divided into efficiently implementable sub-groups.

Figure 4:
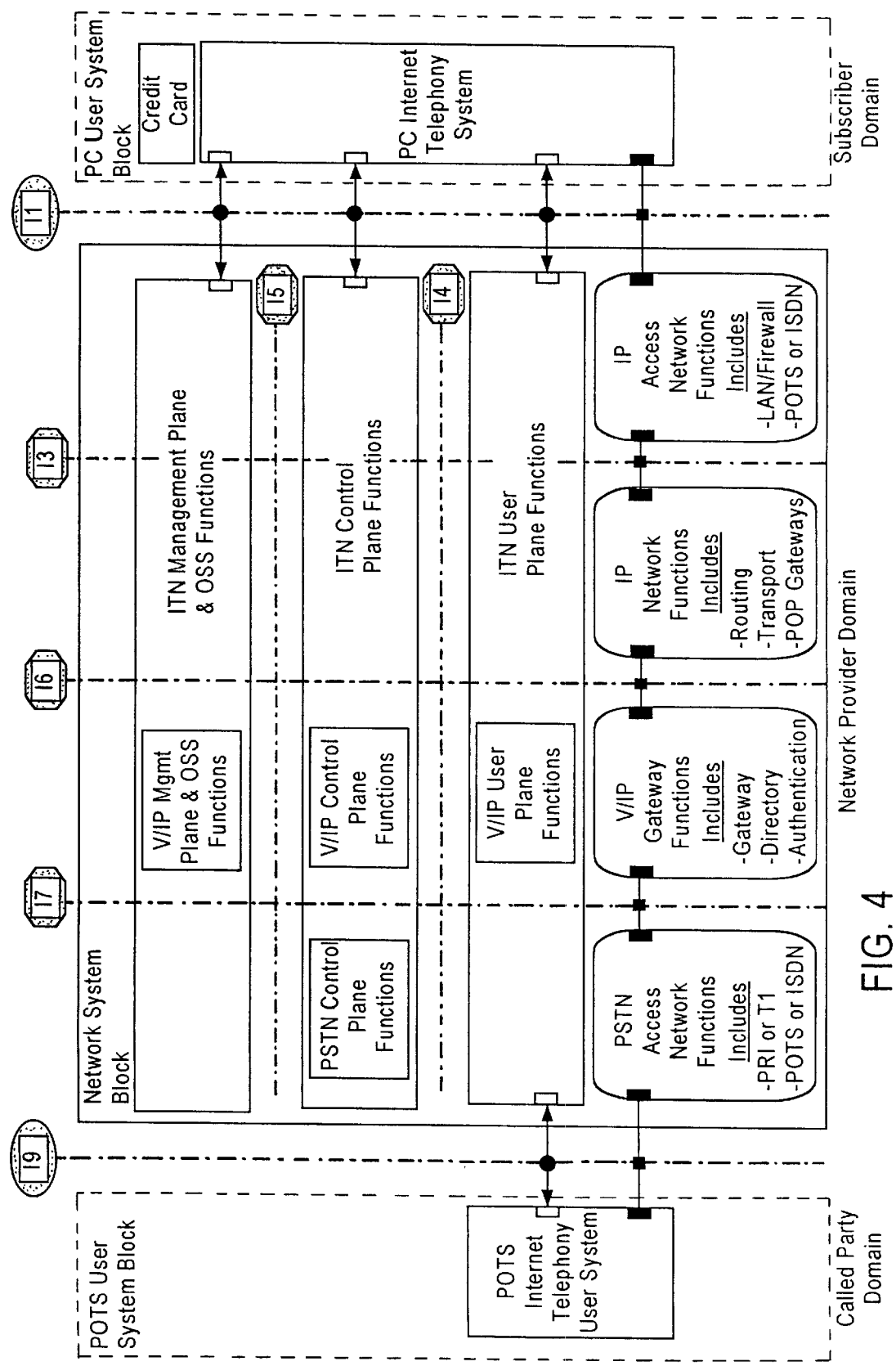
FIG. 4 is an Internet Telephony Network (ITN) block diagram showing the ITN system at a second level of partitioning (partition 2 level).

Referring to FIG. 4 there is provided an illustrating of the ITN system at a second level of partitioning. Within this partitioning there are three planes (types of processes which span all the network elements involved with a service), and four types of network functions (domains of individual transport networks (e.g., PSTN or IP) over which communication must cross).

The three planes are:

The ITN User Plane Functions: These functions are those which are directly involved with real time communications transport and signal manipulation within a network.

The ITN Control Plane Functions: These are the functions which establish or set-up and tear-down communication paths across the User Plane.

The ITN Management Plane and Operations Support Systems Functions (OSS): These are the functions needed to provision and maintain the elements of the User Plane and Control Plane.

The four network functions are:

IP Access Network Functions (right or PC User Side): The IP access network is used locally on the PC user side simply to reach the IP network. This access may be direct via a LAN, or over a circuit switched PPP link connected to a Point of Presence (POP).

IP Network Functions: The IP network is the involved Intranet backbone and associated support systems (such as the DNS), this network provides the IP transport functions.

V/IP Gateway Functions: These are the network functions (and elements) which are involved primarily with supporting a Voice over IP service.

PSTN Access Network Functions (POTS User Side): The PSTN access network consists of the traditional PSTN connecting the Internet Telephony Gateway (ITG) to the called telephone user.

Figures 5, 5A:
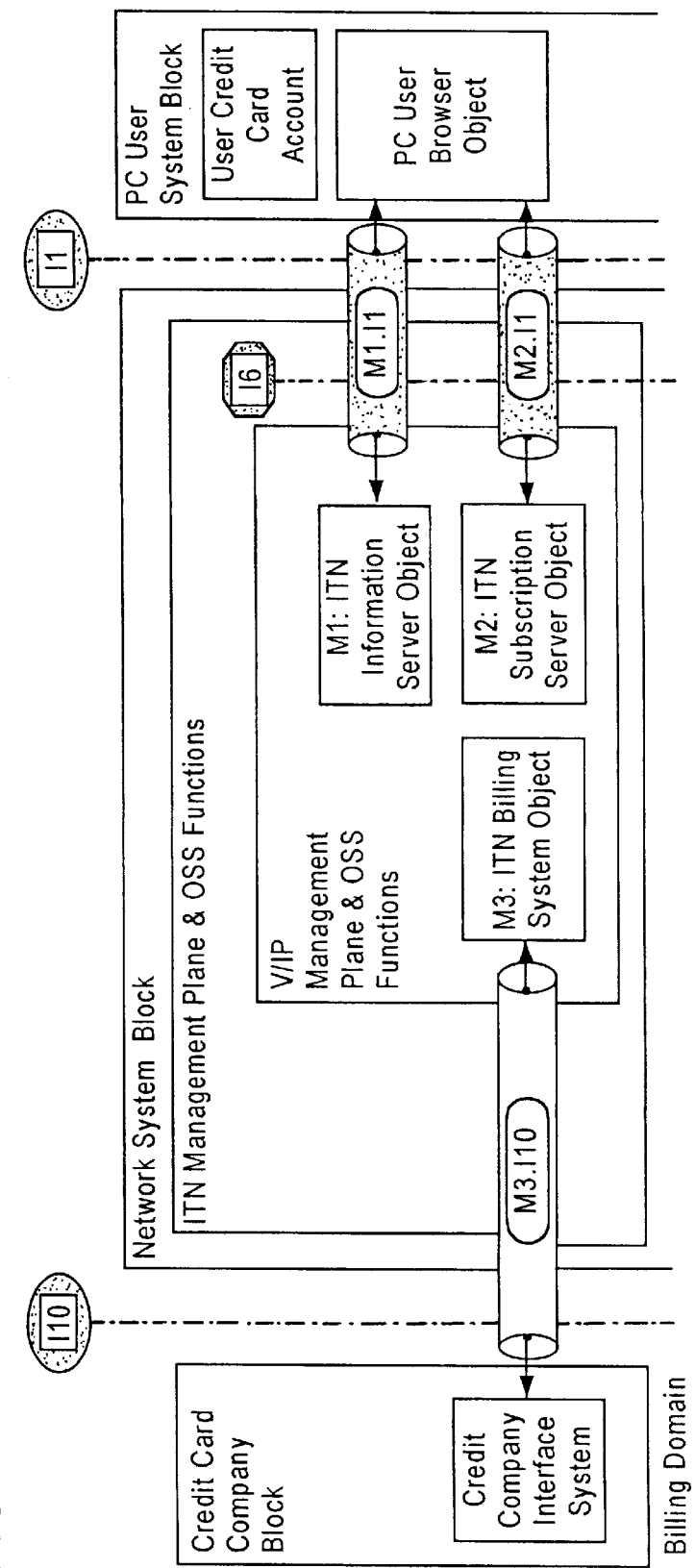
FIGS. 5A and 5B illustrate the V/IP objects and interface relationships between users and the network, including external objects and interfaces.
Figure 5B:
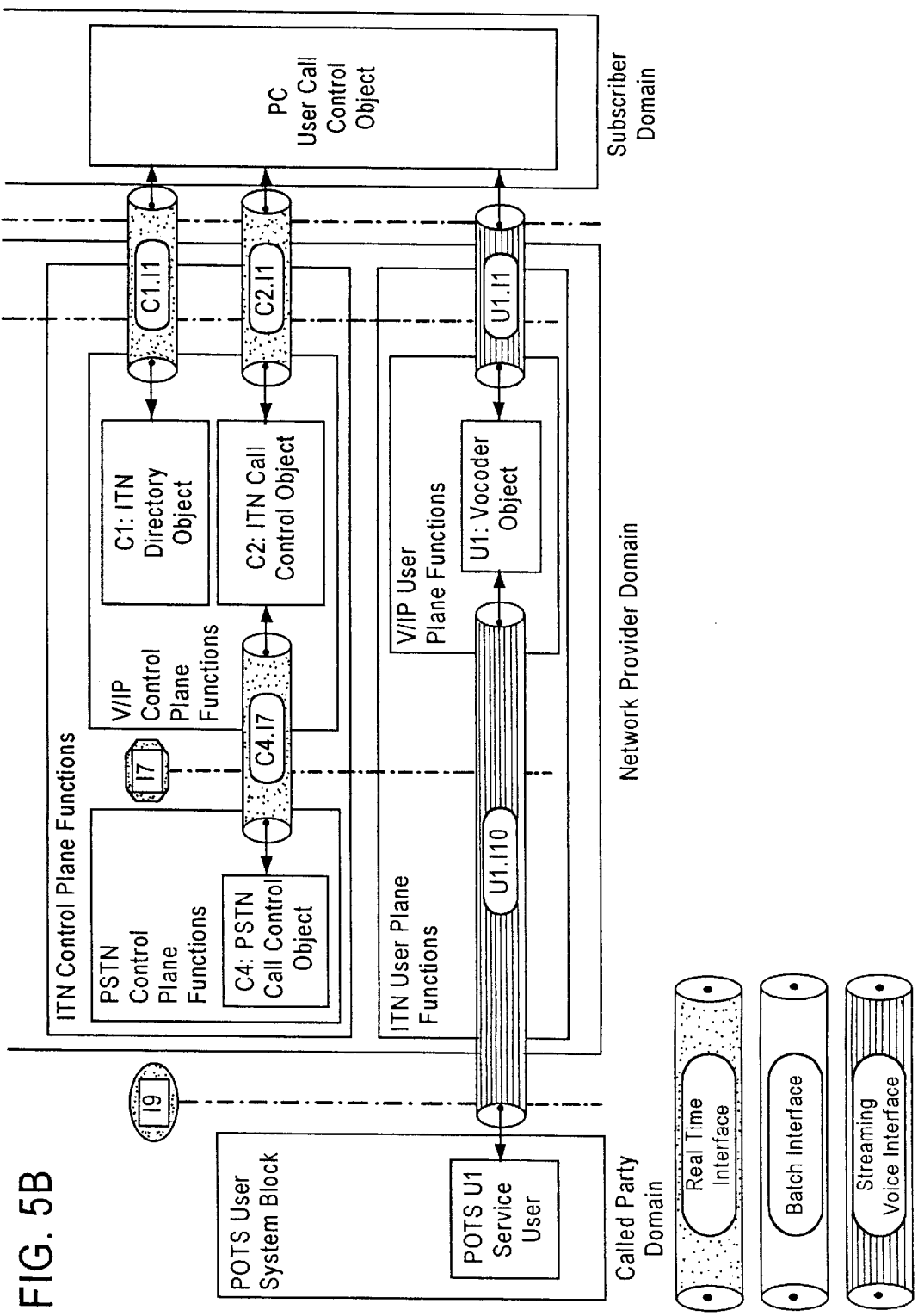

The V/IP Gateway Functions and relationship to the other elements involved with the V/IP service are now described in relation to FIGS. 4 and 5. FIG. 4 illustrates interface references defined between the different User Planes and the different Network Functions. Although this partitioning has been done at the logical level, it is not necessary that physical systems be partitioned in this manner. As an example, an Internet Telephony Gateway may have functions spanning both the Control Plane (call setup) and User Plane (Vocoding).

The internal interface references designated within FIG. 4 are:

1. The interface between the Control Plane and the Management Plane functions is shown at I5. Management functions such as directory table maintenance, surveillance, and periodic billing exports cross the I5 interface.
2. The interface between the User Plane and the Control Plane Functions is shown at I4. Interfaces between various elements of the Control Plane are also designated as I4.
3. The interface between the V/IP Gateway and POTS Access Network is shown at I7.
4. The interface between the IP Network and the V/IP Gateway functions is shown at I6.
5. The interface between the IP Network and the PC Access Network is shown at I3.
6. For the sake of simplicity, one additional interface of lower utilization, I10, is not shown in FIG. 4. This interface is an external billing interface to a credit card provider and is shown and detailed in FIG. 5.

FIG. 5 illustrates the V/IP objects and interface relationships between users and the network, including external objects and interfaces. An object is a major process which has been identified within the functional specifications of the system. An interface is a communications path between two objects. External objects are objects which use interfaces that span between different network functions. By defining external objects and interfaces in this way, the V/IP system elements can be defined based on any communication which might be made across interfaces I6, I7, and I10 as shown in FIG. 5.

FIG. 5 shows a second level of partitioning illustrating the user, control and management planes within the network. Only those objects attached to a new or modified object for the V/IP service are shown. Other previously shown objects required for V/IP in the IP Management and Control Planes between I6 and I3 are not shown. The U1 PC to Phone service is a user plane service which is shown and defined in FIGS. 5 and 6.

Figure 6:
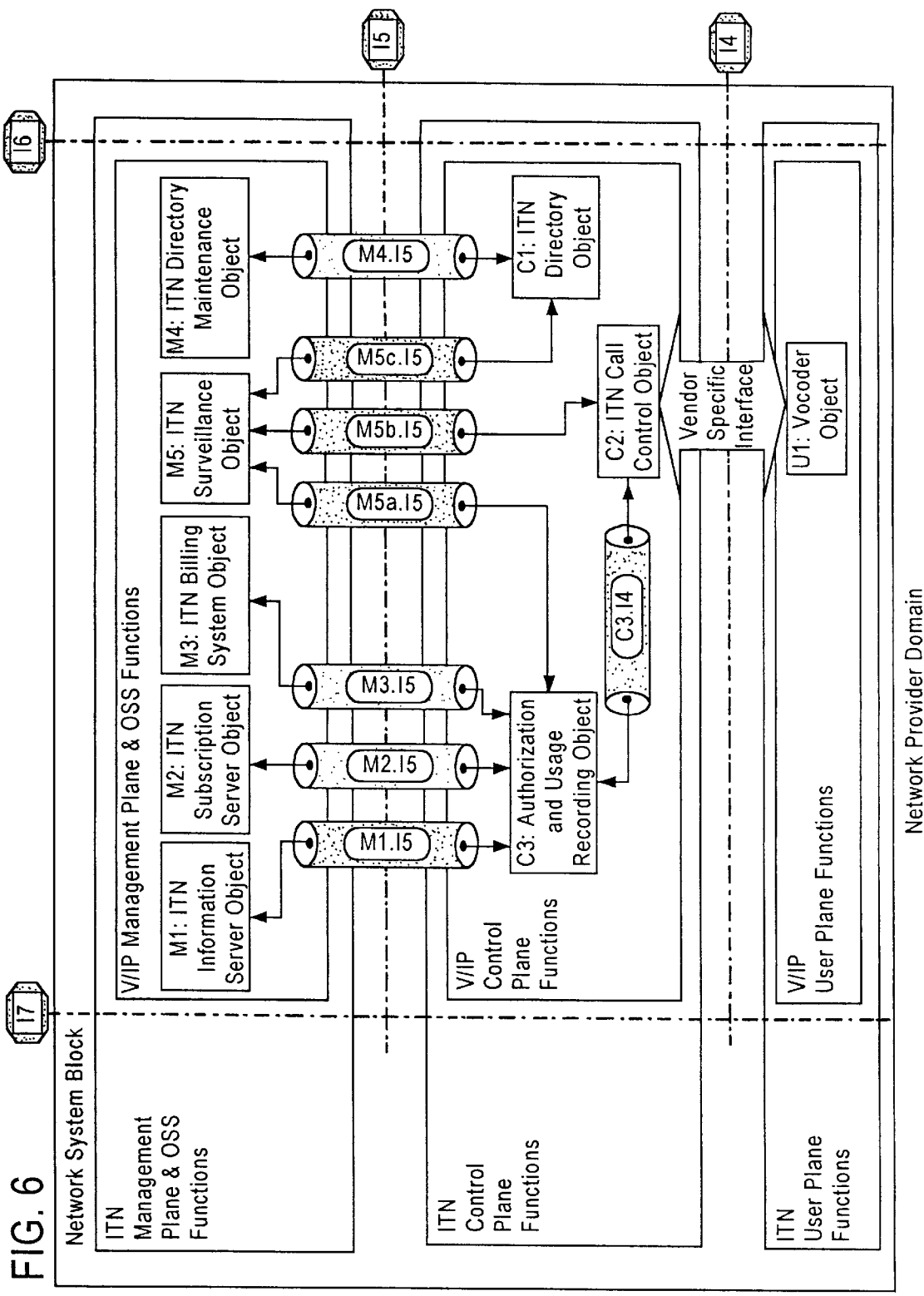
FIG. 6 illustrates the V/IP objects and interface relationships which have been defined between internal ITN objects.

FIG. 6 illustrates the V/IP objects and interface relationships which have been defined between internal ITN objects. Again only those objects or interfaces that are new or modified for V/IP are shown. Multiple objects may be contained within a single physical entity, and this physical entity may cross several planes.

The more significant objects and interfaces are now described in further detail.

ITN objects are considered to be partitions of the ITN processing requirements into sub-systems. A definition of ITN platform objects in this way, independent from protocol or message set constraints, provides a logical view of the system independent of those constraints.

User Plane Objects

U1 Object: Vocoder

The U1 Object converts packetized voice segments (which are encapsulated with IP) to and from circuit switched voice segments (which are encoded in Pulse Code Modulation (PCM)). The Vocoder performs various functions in order to accomplish this. It buffers a certain amount of packetized voice segments in order to maintain a continual flow on the circuit switched network. It dynamically assesses the delay characteristics of the transport network between the Vocoder and the User's software application in order to minimize those buffer requirements.

The Vocoder is able to handle all ITG ports in service, with all participants (on both sides of each call) talking at the same time. The Vocoder also identifies the level of packet loss resulting from voice transport across the IP network and maintains a record of that packet loss for summary reporting. Based on the level of packet loss, the Vocoder applies corrective algorithms to the voice wave form so that the resulting loss of signal quality is minimized for the called PSTN party.

The U1 Object is able to identify a loss of voice content packets, or a continuous stream of format errors in the encoded voice data incoming on the U1.I1 and U1.I10 interfaces (see FIG. 5). If such a condition is found and there has been no corresponding signaling at the control plane level, U1 will notify C2 to pull down the connection and perform any necessary clean up tasks.

User Plane Interfaces

Two user plane interfaces are defined:

External Entity to V/IP User Plane

1) U1.I1: The Internet Telephony Packetized Voice Interface is an external interface which is responsible for transporting Vocoded, packetized voice segments across the IP Access Network and IP Network.

2) U1.I10: The Circuit Switched Voice Interface is an external interface responsible for transporting PCM voice segments across the PSTN.

Control Plane Objects

Three control plane objects are defined:

1) C1: Internet Telephony Gateway Directory Object
2) C2: Internet Telephony Call Control Object
3) C3: Internet Telephony Authorization and Usage Recording Object (Internal)

The C1 Object: The Internet Telephony Gateway Directory manages which E.164 addresses (telephone numbers) are served within the terminating footprint of a particular ITG. The management of the terminating footprint may be in the form of NPA-NXX ranges which relate to an IP address for a single ITG. When queried with a "called" telephone number by the PC Call Control Object, the C1 Object returns the IP address of the Internet Telephony Gateway (ITG) that serves the called telephone number.

The IP address of the V/IP Server is communicated to the PC user or Client software application prior to initiating contact with the C1 object. The object's TCP port number for the C1 directory application is defined, selected, and maintained within the client software.

The C2 Object: Internet Telephony Call Set-Up may be described as follows:

The ITN (ITG) communicates with the PC user to establish a PC-to-Telephone call. The call setup is originated by the PC user and destinated or terminated by the telephone user by supplying the address or number of the called terminal. However, it is the C2 Object or Call Control Object which coordinates the signaling among the involved network elements. Included in this signaling are:

Management of the state of the call with the client PC software (via C2.I1 shown in FIG. 5).

Validation of a PC users' Account number and password (via C3.I4 shown in FIG. 6).

Establishment and tear down of the PSTN circuit (via C4.I7 shown in FIG. 5).

Generation of usage information which is sent for processing and pricing (via C3.I4 shown in FIG. 6).

Managing the state of the connection within C3 (via C3.I4 shown in FIG. 6).

When initiating a V/IP call, the PC user may be required to provide the 10 digital E.164 (ITU-T telecommunications numbering or telephone number) address of the called telephone user, the IP address of the ITG associated with the called telephone user (obtained via the C1 Object), the PC's IP address, as well as the billing account number and associated password.

The C2 object is able to signal various states of a connection (ringing, busy, etc.) to a PC user. If the C2 object receives a maximum call duration from C3 during call set-up, this maximum call duration is sent to the PC software either as an audio message or as information to be presented on the PC screen. C2 generates the raw usage records which are sent to C3. A usage record is not tagged as billable unless the PC application has acknowledged its receipt of a connection establishment message. The C2 object may require a user ID and password to be provided by the PC Client software prior to completing a V/IP call. This information is authenticated via the C3 object.

The C3 Object: User Authorization and Usage Recording

The C3 Object ensures coordination between User Authorization and Usage Recording for a single PC user's customer account. C3 also responds to external requests for that information. C3 is a unitary logical object with distributed instances. That is, physically distributed account, authorization, validation and billing databases are so arranged as to be usable as a single logical object. The data associated with a user subscriber account is typically stored in an instance of C3 which is local to the user subscriber. The C3 Object is invoked during a call when an Authorization request is relayed over C3.I4 (this request typically consists of an account number and password provided by PC User). At this point C3 checks the account's password and available monthly minutes remaining, and responds appropriately to C2. Optionally, C3 can respond to C2 with a maximum allowable minute duration for a call. Successful account validation by the C3 Object is a prerequisite to successful call establishment by the C2 Object.

The C3 Object is also responsible for accepting usage recording data from C2, and decrementing the minutes used from the available minutes (and/or optionally pricing that usage, and decrementing that priced amount from a customer's existing balance), and then logging the information. Preferably, C3 also knows the state of a users connections across multiple ITGs. With this state information, the authorization system may ensure only one call per account is being handled by the network, and/or ensure that the maximum available minute limit is not being circumvented by multiple concurrent sessions (otherwise a second PC caller might receive authorization for a call prior to the posting of the first caller's usage record).

The theory behind bundling usage recording, pricing, and authorization into one logical object is to significantly reduce the potential for fraud when the system is widely deployed. By having a single logical database which is managing customer authentication, authorization, and usage pricing for the network, data synchronization is facilitated, and opportunities for fraud are minimized. As described, it is not necessary that C3 be implemented as a single physical system. The C2 Object will provide C3 with a customer billing account number and a password (originally supplied by the PC user). The C3 Object maintains a current account "minutes remaining" balance and usage records for each user on a monthly basis. This usage information can be extracted in real time based on a request from the M1.I5 interface as shown in FIG. 6.

If a user who is requesting authorization has a low "minutes remaining" balance, and this low balance will result in a maximum call duration which is shorter than the maximum call duration typically allowed by the network, then the Authentication server will transmit a maximum call duration back to the C2 Object.

The Control Plane Interfaces
Four control plane interfaces are defined:
External Entity to V/IP Control Plane
1) C1.I1: The Internet Telephony Directory Interface is an external interface which is responsible for PC to Directory services address resolution (see FIG. 5). The client PC provides the E.164 address (telephone number) of the intended party to be called, and the Directory service returns the IP address of the appropriate hop-off Internet Telephony Gateway.
2) C2.I1: The Internet Telephony Call Management Interface is an external interface which is responsible for PC to Internet Telephony Gateway signaling for call establishment and tear-down.
3) C4.I7: PSTN Call Management Interface is an external interface which is responsible for managing signaling to the PSTN which is necessary for the PSTN to establish and tear down circuit switched connections to the called party. Signaling from the ITG to the serving PSTN central office is preferably via PRI ISDN. Alternately, T1 E&M PSTN signaling may be used.
4) C3.I4: The Internet Telephony Authorization and Usage Recording Interface is an internal interface shown in FIG. 6, and is responsible for two functions. First the interface must allow for an authorization of ITG usage by a service subscriber. Second, the interface must maintain the current state of a subscriber's connections within C3, as well as pass ITG generated usage records from C2 to C3 in real time.

Management Plane Objects
Five management plane objects are defined and shown in FIG. 6:
1) M1: ITN Information Server & Feedback Object
2) M2: ITN Subscription Server Object
3) M3: ITN Billing System Object
4) M4: ITN Directory Maintenance Object (Internal)
5) M5: ITN Surveillance Object (Internal)

The M1 Object: The ITN Information & Feedback Server allows the PC user to access information on the V/IP service including general and user-specific information. Essentially, the M1 Object is the HTML interface to the V/IP network for subscribers of the service. Following is the information which the user might request from the ITN via HTML:

Descriptions on how to download and install client software and operate the service
Descriptions of service availability and pricing plans
Graphical (map) areas showing the ITG terminating footprints
NPA-NXX ranges supported by the ITG terminating footprints
Call usage record details (will extract the data from the control plane in real time via M1.I5)
Billing account status & balance (will extract the data real time via M1.I5)
Change of the ITN password (will verify old password and update to new password via M1.I5)
An introductory page, with links to each of the pages items listed above.

Operationally the M1 Object interface will be accessible via commercial browsers and at least a Netscape 3.0 or Internet Explorer 3.0 web browser. On any customer specific request for usage records or account balance, a PC user will have to provide within the query the same account number and password which is used for call establishment. This information will be validated by C3 when fulfilling the request.

The M2 Object: ITN Subscription Server: The ITP allows the PC user to subscribe to the V/IP service via an on-line process. Information gathered from the potential subscriber will include:

ISP (Internet Service Provider) account number
ISP email address
CPU type of PC, amount of memory
Type of sound card, microphone and speakers
Operating System and version
Global Service Provide (GSP)
Free disk space Upon activation the subscriber will receive notification via email. This email will include instructions, the web page URLs (Uniform Resource Locator or www (World Wide Web) address) needed to get started, and an initial password (which can be changed via M1).

The M3 Object: ITN Billing System: Monthly, the M3 Object will poll C3 to extract account balances and credit card numbers in order to request payments from credit card companies. As account balances are processed by the M3 Object, failed billing attempts will be flagged in a report (either formatted as ASCII, or in a PC database product's format).

The M4 Object: ITN Directory Maintenance: Directory data (in the form of NPA-NXX ranges pointing to ITGs) will be created, validated, and managed outside of the network (away from C1, the ITN Directory Object). The M4 object is responsible for this function. M4 will accomplish this by assisting in the creation of the Directory tables in a format which can be exported directly (via M4.I5) to C1. The M4 Object preferably also supports the creation of graphical maps showing the terminating call areas supported by the ITGs. The maps and the NPA-NXX table information may be exported so that it may be presented to the user via M1. Off the shelf software products like MapInfo may be used to support the requirements of M4.

Operationally the M4 Object is able to import NPA-NXX data, along with supporting graphical central office serving area information. The object is able to graphically define ITG terminating calling areas. The M4 Object automatically generates the NPA-NXX to ITG IP address Directory table based on the graphical information provided above. The M4 Object supports multiple versions of the C1 Object Directory database.

The M5 Object: ITN Surveillance: The V/IP service may cross many network elements within the ITN. Having a centralized surveillance capability which can span multiple platforms ensure its operation. The M5 Object attempts to identify and log critical alarms, and to present these alarms to an administrative console. Such alarms may include: Whether a network based application is under distress (via an SNMP Management Information Block (MIB)), whether the system is alive and communicating with the network (via "Ping" or similar function), whether required application processes are active and if they need to be restarted (via a "ps -eaf" or similar function), whether the processes are sane (via periodic test queries to validate correct responses).

These types of problems may be analyzed by M5, and alarms generated and logged within C5 at four levels: Critical (service affecting), Major (user intervention recommended), Minor (of note), and Informational (components reporting normal operation). These alarms may be used to manage a local database containing managed objects representing the current operational state of ITN platforms and processes. Each managed object and/or platform will be assigned one of three operational states: Red (out of service), Orange (operating with degraded capabilities), and Green (operating normally). A graphical representation of the ITN network is presented to a console via a standard display package such as OpenView. Console operators have the option of directly connecting to any ITN object or system to perform troubleshooting or diagnostic operations. This connection presents the console operator with the same capabilities as a local system administrator.

With respect to M5 addressing requirements, new elements added to the ITN will have their IP addresses and their type of object identified in M5. The M5 Object will create its database of managed objects dynamically (once given the IR address or host name) via the M5x.I5 interfaces.

Management Plane Interfaces

Ten Management Plane Interfaces have been defined:

External Entity to V/IP Management Plane

1) M1.I1: Internet Telephony Data Request Interface
2) M2.I1: Internet Telephony Subscription Interface
3) M3.I10: Credit Card Provider Interface V/IP Management Plane to V/IP Control Plane
4) M1.I5: Internet Telephony Network Data Extraction Interface
5) M2.I5: Internet Telephony Subscription Management Interface
6) M3.I5: Internet Telephony Billing and Usage Extraction Interface
7) M4.I5: Internet Telephony Directory Maintenance Interface
8) M5a.I5: Internet Telephony Call Management Surveillance Interface
9) M5b.I5: Internet Telephony Authorization and Usage Recording Surveillance Interface
10) M5c.I5: Internet Telephony Directory Surveillance Interface The functions of these interfaces are as follows:

The M1.I1 Interface: The Internet Telephony Data Request external interface is responsible for providing a subscriber with data requested about the ITN in real time.

The M3.I10 Interface: The Credit Card Provider external interface is responsible for allowing an ISP to place a charge against a user's credit card account number.

The M1.I5 Interface: The Internet Telephony Network Data Extraction internal interface is responsible for providing the M1 Object with real time data regarding a subscriber's remaining minutes of use, usage records of the current and previous billing cycle, and/or calls currently in progress. The M1 Object will reformat and present this data to the subscriber who requested it.

The M2.I5 Interface: The Internet Telephony Subscription Management internal interface is responsible for managing the list of account numbers allowed to use the ITN. This interface supports several functions: an initial baton load of subscribers and initial passwords, adding or removing individual account numbers, and resetting individual passwords.

The M3.I5 Interface: The Internet Telephony Billing and Usage Extraction internal interface is responsible for performing a periodic extraction of usage records from the network.

The M4.I5 Interface: The Internet Telephony Directory Maintenance internal interface is responsible for maintaining the NPA-NXX to hop-off ITG directory data.

The M5a.I5 Interface: The Internet Telephony Call Management Surveillance internal interface is responsible for carrying a variety of information which allows M5 to assess the availability, health, and status of the physical computer and software processes of the various Internet Telephony Gateways.

Figure 7:
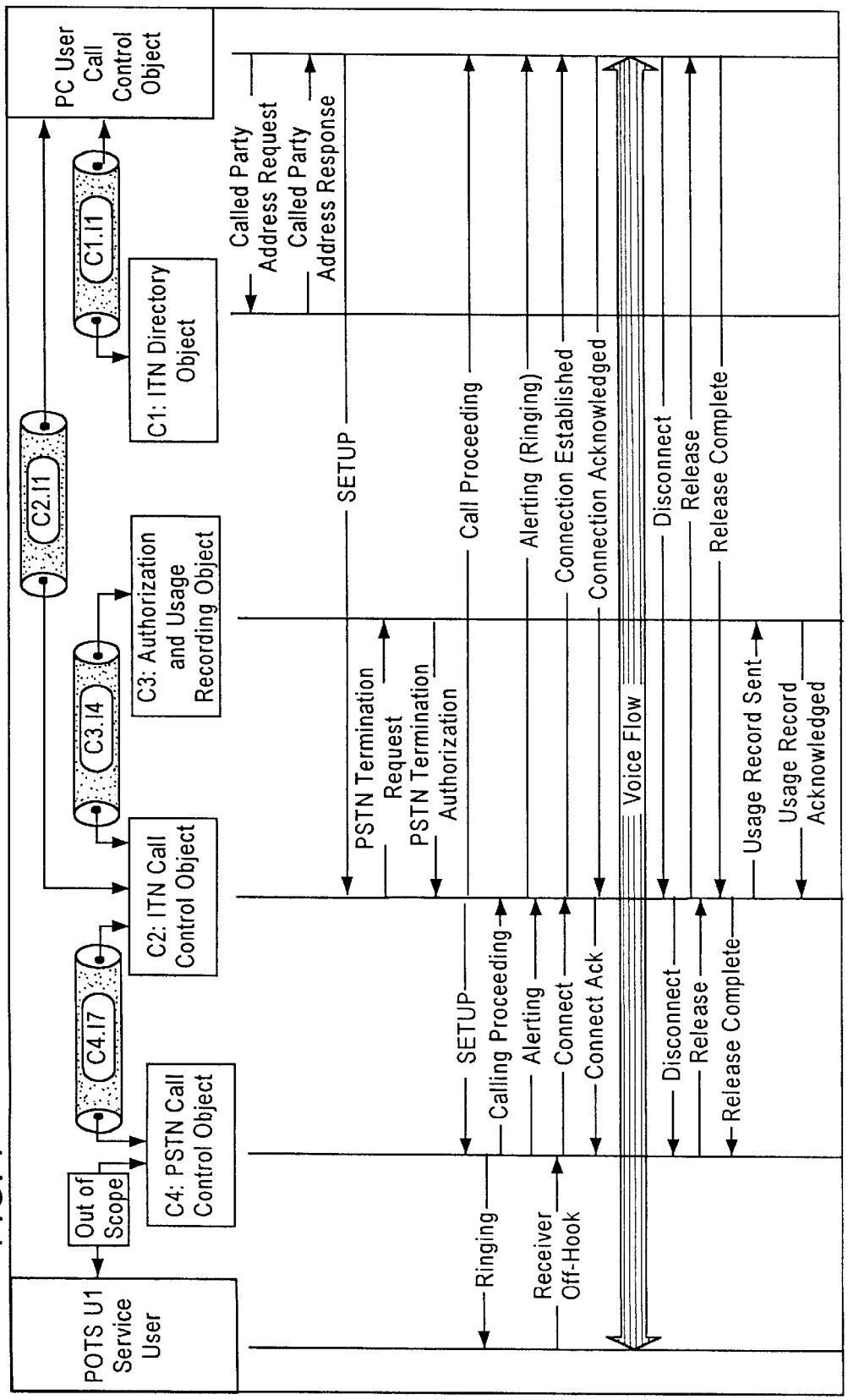
FIG. 7 is a diagram of a typical control plane message flow.

Based on the foregoing descriptions of the interfaces and objects a high level call flow of signaling messages is described. FIG. 7 illustrates an example diagram of such a control plane message flow. This example should be understood to show one version or embodiment of a set of messages which may be implemented for a PC to PSTN service. Converse messages would be utilized for a PSTN initiated PSTN to PC service, as well as appropriate corresponding messages for PC-PC and telephone-telephone service. Additional messages may be added if enhanced functionality is provided.

The call flow starts at the point where the user has established IP layer connectivity with the network, and has invoked the V/IP software application. This preliminary procedure typically entails the following steps by the party initiating the call (not illustrated in FIG. 7):

1. The customer will boot the PC, and connect to the IP network following their existing procedures for network access.
2. The customer will launch their V/IP application, either as a plug-in to an existing browser or as a stand-alone application. When launched, this application will present a template of fields which are required to initiate a call.

3. The customer will populate a "telephone number to be called" data field. The customer will also either populate his/her account number and password, or the application will reapply this data if it has been previously saved within the application.
4. The customer will then initiate the call. During the call, the call's completion status will be presented in real-time to the user by the application (via a visual display). One example of the call initiation procedure is now described.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application as described in the foregoing preliminary procedure, the C1 Object returns the IP address of the associated ITG (C2 Object).
2. The PC's V/IP software application invokes the C2 Object to set up a call by passing to C2 the number to be called, the user's account number, and a password. This is shown as SETUP in FIG. 7.
3. C2 invokes the C3 Object in order to receive authorization to proceed with the call (PSTN Termination Request). This may entail communication among instances of the distributed database to verify the account status of the caller and optionally set a limit on the duration or cost of the call depending upon the account status and/or balance. The pricing of the call may be communicated to C2 for communication to the caller. C3 will pass the authorization information back to the C2 (PSTN Termination Authorization).
4. If authorization was successful, C2 will establish the PSTN connection, and notify the client software that the call is proceeding (SETUP Call Proceeding). C2 may also pass on to the calling PC the pricing information obtained from C3. C2 will continue to update the client software with call establishment information as the call is proceeding and may also pass along to the caller a running account of the cost of the call.
5. After the call has been established, the PC will respond to the network that it recognizes that a connection has been established (Connection Acknowledged), timing of the call's duration can be initiated, and any usage measurements will indicate that the call is billable.
6. Steady state call (Voice Flow).
7. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.
8. The C2 Object passes a usage record to C3 for reporting. The C3 Object may also initiate individual call billing by reporting to M3 as shown in FIG. 6.

Figure 8:
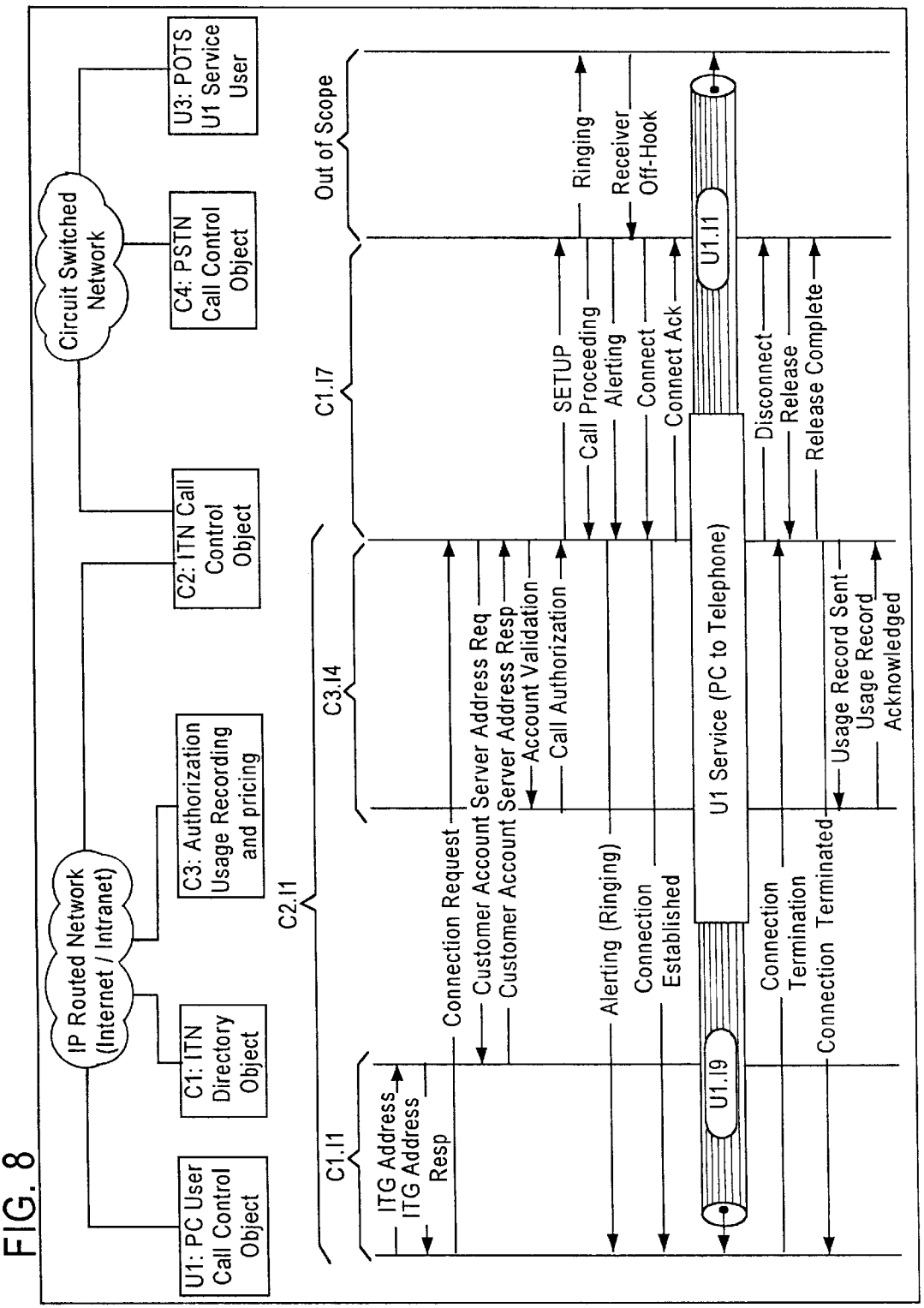
FIG. 8 is a diagram of another typical control plane message flow.

A modified version or embodiment of the call set up procedure is now described in connection with FIG. 8.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application, the C1 Object returns the IP address of the associated ITG (C2 Object).
2. The PC's V/IP software application invokes the C2 Object to set up a call by passing to C2 the number to be called, the user's account number, and a password (Connection Request).
3. The C2 Object invokes the C1 Object to request the customer account server address (Customer Account Server Address Req), which is then returned (Customer Account Server Address Resp).
4. The C2 Object invokes the C3 Object for account validation (Account Validation) using the Customer Account Server Address (address of the instance of the C3 object database) and receives call authorization (Call Authorization). This may include limitation as described in connection with the description of FIG. 7.
5. If authorization was successful, C2 will establish the PSTN connection, and notify the client software that the call is proceeding. C2 will continue to update the client software with call establishment information as the call is proceeding.
6. After the call has been established, the PC will respond to the network that it recognizes that a connection has been established (Connect Ack), timing of the call's duration can be initiated, and any usage measurements will indicate that the call is billable.
7. Steady state call (U1 Service PC to telephone).
8. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.
9. The C2 Object passes a usage record to C3 for reporting and for individual call billing if that option is chosen. The C3 Object acknowledges receipt of the usage record to C2.

Figure 9:
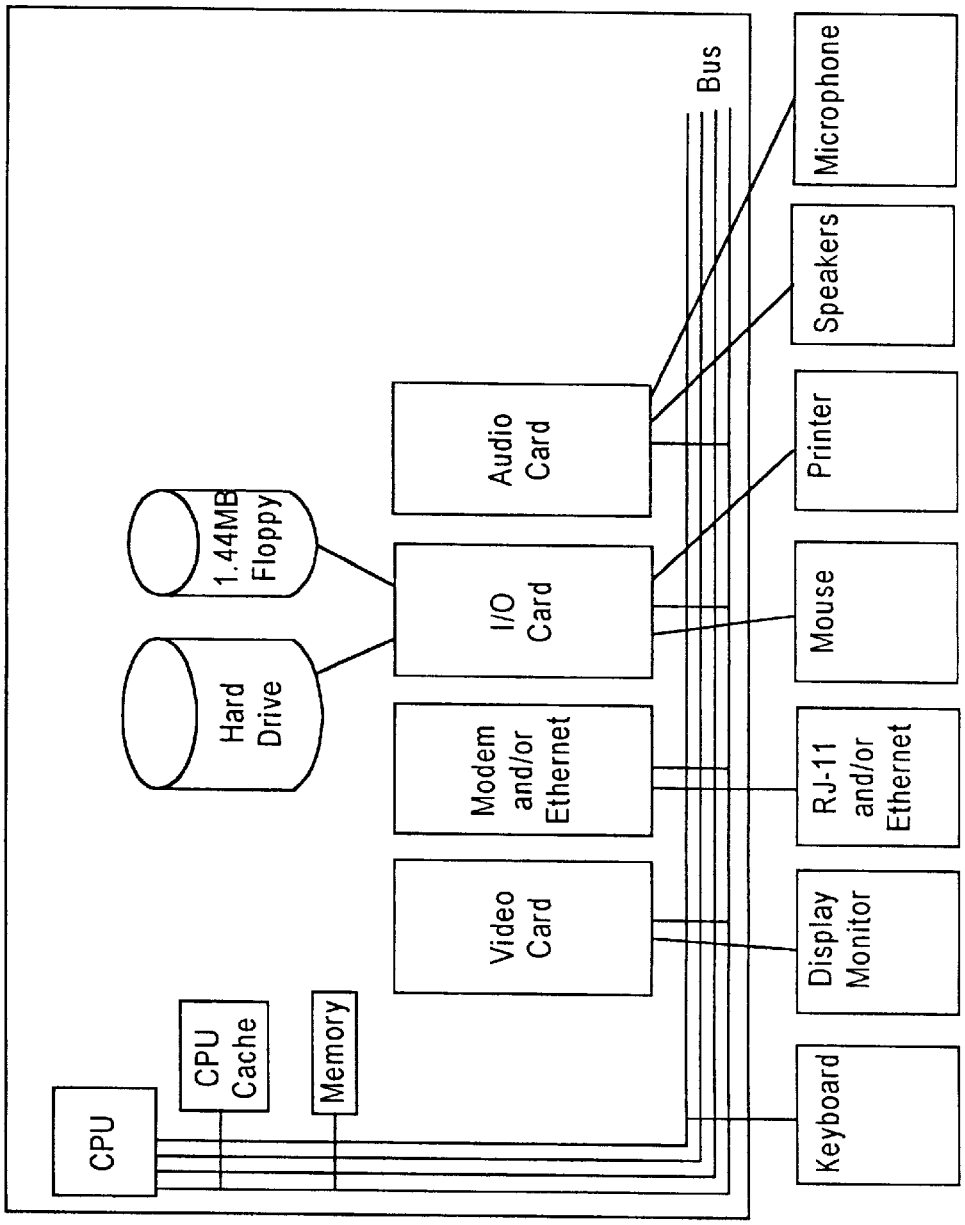
FIG. 9 provides a high level diagrammatic illustration of a typical PC which may be utilized by a user in the system of the invention.

FIG. 9 provides a high level diagrammatic illustration of a typical PC which may be utilized by a user in the system of the invention.

Figures 10, 10A:
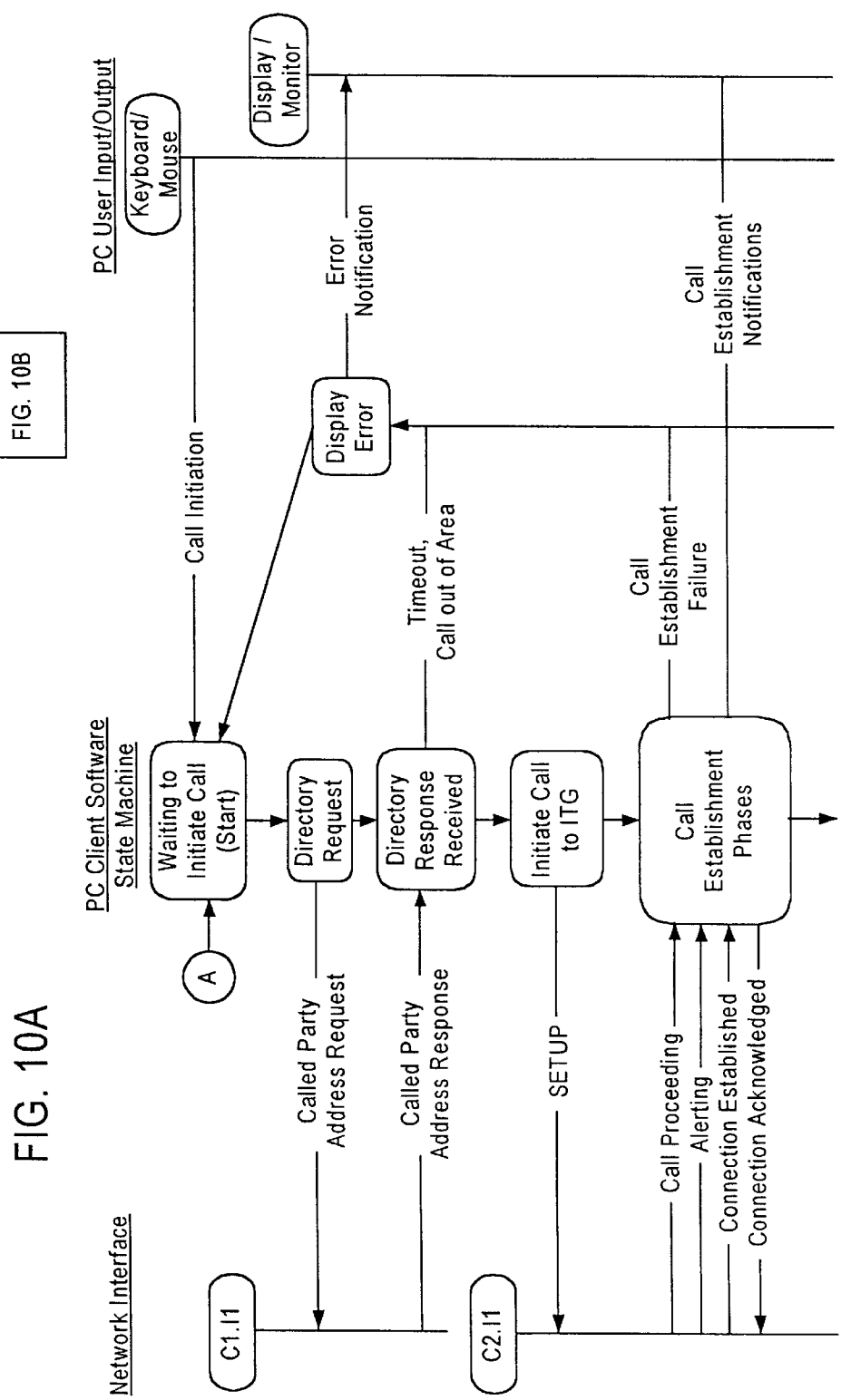
FIGS. 10A and 10B illustrate a typical client software state machine.
Figure 10B:
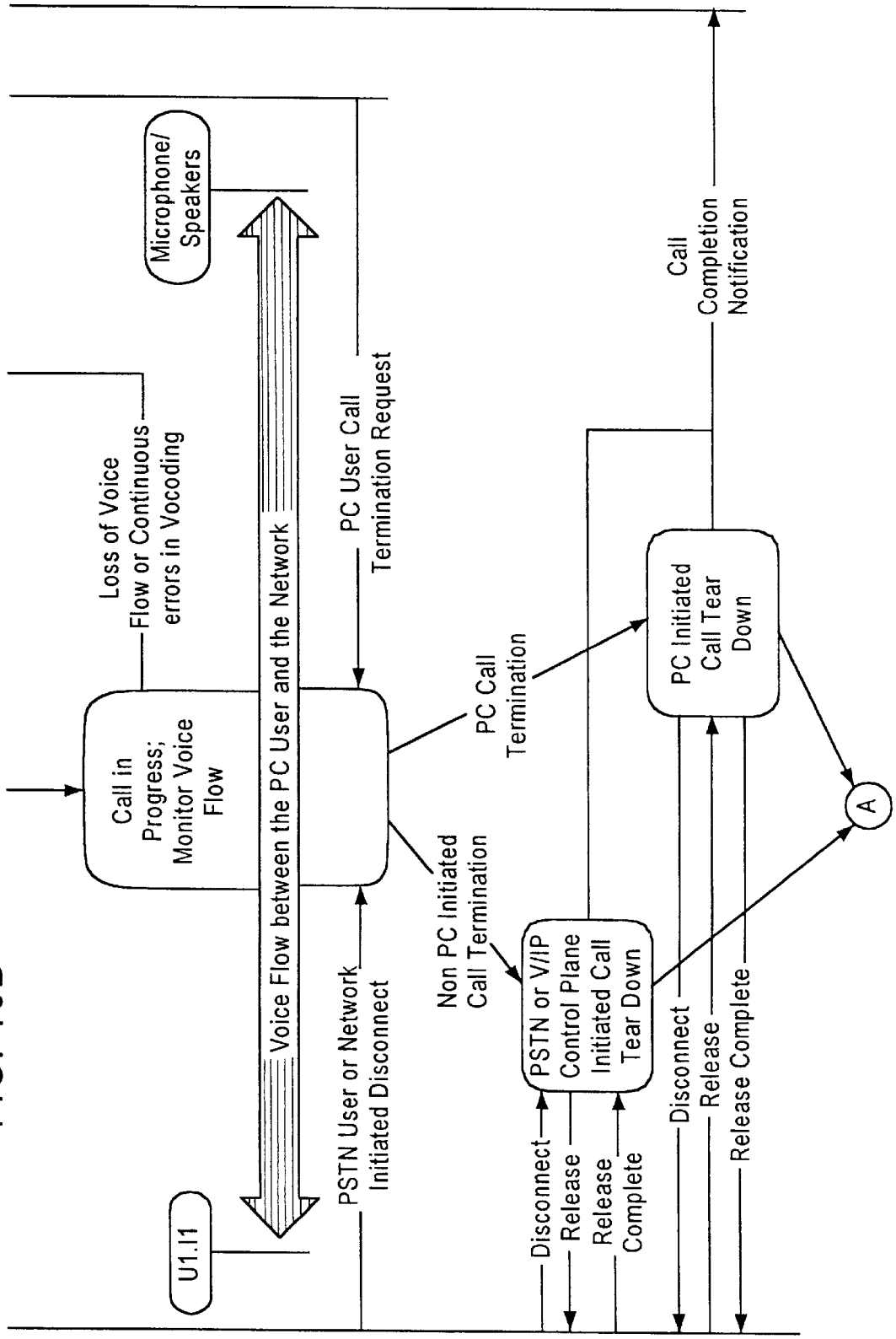

FIG. 10 illustrates a typical client software state machine which is executed in the subscriber's PC. The V/IP software state machine correlates operations within the environment of the typical/high end PC of the user. FIG. 10 provides an example of how the end user interacts with the V/IP network via the client software. Interaction between the PC user and the software's state machine utilizes messages which cross between the client software's state machine and the operating system's input/output drivers for each hardware device. The more significant messages and the content which they may carry may be summarized as follows:

Keyboard/Mouse

Call Initiation: This comprises the input of information needed by the state machine (and the V/IP control plane) which is required to establish a call. The information includes the calling party's account number and password, as well as the telephone number being called.

PC User Call Termination Request: This comprises the input of a notification by the user to the software to conclude the call.

Display/Monitor

Error Notification: This comprises a dialog which shows the reason for the failure of a particular call.

Call Establishment Notification: This refers to the display information showing the step-by-step progression of a call as it is established through the network.

Call Completion Notification: This comprises a dialog which shows the statistics of a completed call.

Figure 11:
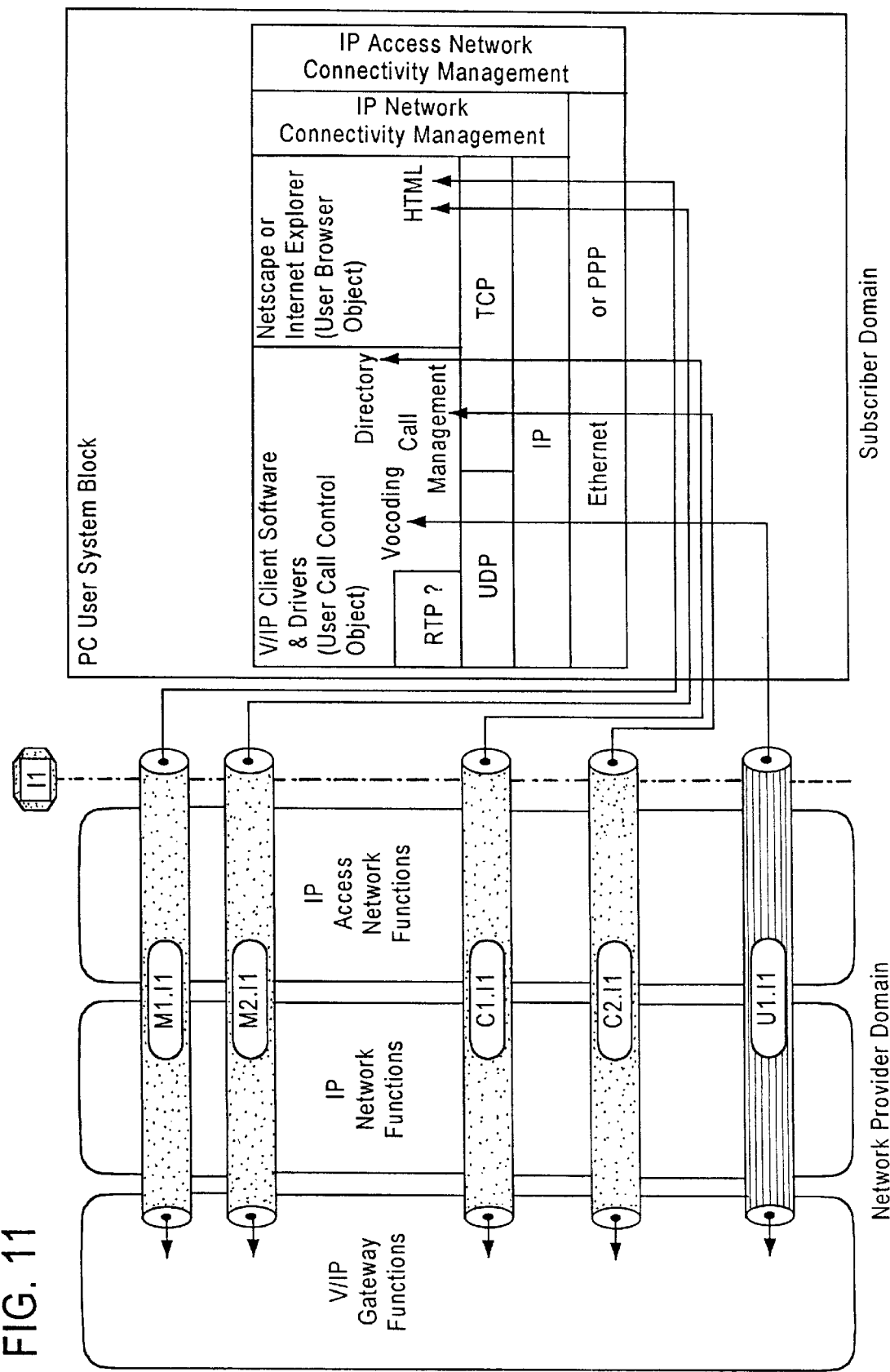
FIG. 11 shows the PC software interface and the relationship to the ITM interfaces.

FIG. 11 shows the PC software interfaces (stack) and the relationship to the ITN interfaces. It is necessary that the V/IP software state machine fit seamlessly within the environment of a typical high end PC owned by an ISP subscriber. FIG. 11 shows how the state machine interacts with the other software components for Internet connectivity and communication. Using the types of PC shown in FIG. 9, state machine shown in FIG. 10, and interface relationships shown in FIG. 11, the following customer software characteristics and functions are significant:

1. It is not necessary for the client software to validate that IP Access Network or IP Network connectivity has been established prior to attempting to communicate with the network. The availability of connectivity across these layers is assumed. A lack of response by the network to the application's state machine is displayed to the user as a lack of network level connectivity.

2. Each of the five V/IP network interfaces is able to have their transactions traverse seamlessly across the IP Access Network and IP Network. The client software should use the same IP network drivers which are used for their existing ISP Internet connectivity. Client software driver conflicts or adverse interactions should not occur with the installed base of PC software.

3. All management plane interfaces with the user may be via the PC's existing Web Browser. The client software need not take on the task of managing network based customer data.

4. The compressed voice interface, U1.I1, preferably communicates via UDP (User Datagram Protocol), however, RTP (Routing Table Protocol) on top of UDP is also an option. If RTP is used, the client software should validate that it is a valid option over the existing IP network.

5. If RTP is selected, and communication over the IP Access network is performed with a PPP link, RTP header compression should be supported in order to reduce the required IP Access network bandwidth.

6. The software must be able to transmit DTMF digits to the hop-off ITG. Preferably the digits will be transmitted "out of band" (in other words, the PC will not generate DTMF signals which are transmitted as compressed tones).

7. The software should be able to transmit the length (duration) that a DTMF digit a pressed.

8. The software should display to the user the current state of a call as it is made through the Internet Telephony Gateway (ITG).

9. The voice played back to the PC user will be toll quality. The Vocoder includes capabilities such as echo cancellation, it should be able to handle varying levels of packet loss and latency, and it should be able to apply corrective algorithms to the voice stream.

10. A user account number and password should be required within the Call Initiation message to the state machine. If the user so chooses, these items should be able to be saved within the client application.

In order to insure ease of use and maximum utility to the subscriber it is desirable to provide for the subscriber an easy access and instructional tutorial as to the use of the system. At the same time it is also desirable to provide the subscriber with his/her billing account balance, status, and call usage details on a real time basis. This information may include descriptions on how to download and install client software and operate the service, descriptions of service availability and pricing plans, graphical (map) areas showing the ITG terminating footprints, and NPA-NXX ranges supported by the ITG terminating footprints. With respect to account information the data available to the subscriber may include call usage record details, billing account status & balance, and verification of the existing password. All of the foregoing may be conveniently provided through the use of an introductory page with links to pages that provide access to each of the foregoing.

The system of the invention provides the above described features through the architecture illustrated in FIGS. 4, 5, 6, and 12. Thus FIG. 6 shows the authorization and usage object C3 connected to an Information Server Object M1 in the V/IP management plane. This information and feedback object M1 comprises a server separate from the C3 authorization and usage object but connected to the C3 control plane object via the M1.I5 interface between the ITN management plane and control plane functions. The M1 object serves as an HTML interface to the V/IP network for subscribers to the service.

Operationally the M1 Object interface is accessible via commercial browsers and at least a Netscape 3.0 or Internet Explorer 3.0 web browser. On any customer specific request for usage records or account balance, a PC user will have to provide within the query the same account number and password which is used for call establishment. This information will be validated by C3 before fulfilling the request. The M1.I1 link between the PC user browser and M1 information server is shown in FIG. 5. The subscriber, using a commercial browser such as Netscape 3.0 or Internet Explorer 3.0 and HTML by way of example, accesses the information server via M1.I1. The information server validates the password and obtains the information from the authorization, usage and account object C3 via M1.I5, and presents the information to the PC user subscriber with the correct formatting display via M1.I1.

The M1 information server provides real time interface to the authorization, usage and account object C3 while at the same time also provided isolation of the C3 object. The information server thus provides an intermediary which, among other things, prevents undesirable interaction between information retrieval and service implementation in the C3 authorization, usage and account object. Appropriate sizing of the capacity of the information server permits the provision of virtually instant access for subscribers without necessarily requiring interrelated sizing of the authentication, usage and account object.

The combination of the logically unitary distributed authorization, usage and account object with this intermediary information server, which is constantly available to subscriber, presents a unique and powerful tool for information retrieval and usage. As has been previously explained, the distinctive authorization, usage and retrieval object provides tracking or multiple ongoing calls against the same account through separate and geographically distal ITGs and network elements.

The new information server permits a subscriber to engage in real time monitoring of this activity and real time tracking of overall amount status and balance. Further, there is no requirement that the subscriber perform such monitoring or information gathering from a fixed locale. The information is as readily available from a hotel room by laptop computer as from the home location of the subscriber. Still further, the information may be retrieved and monitored not only by the subscriber but also by any entity with valid credentials for accessing the service, such as a super account holder or employer. This also provides a mechanism for an employer to act on the obtained information to place a stop on further use of any supervised account.

Figure 12:
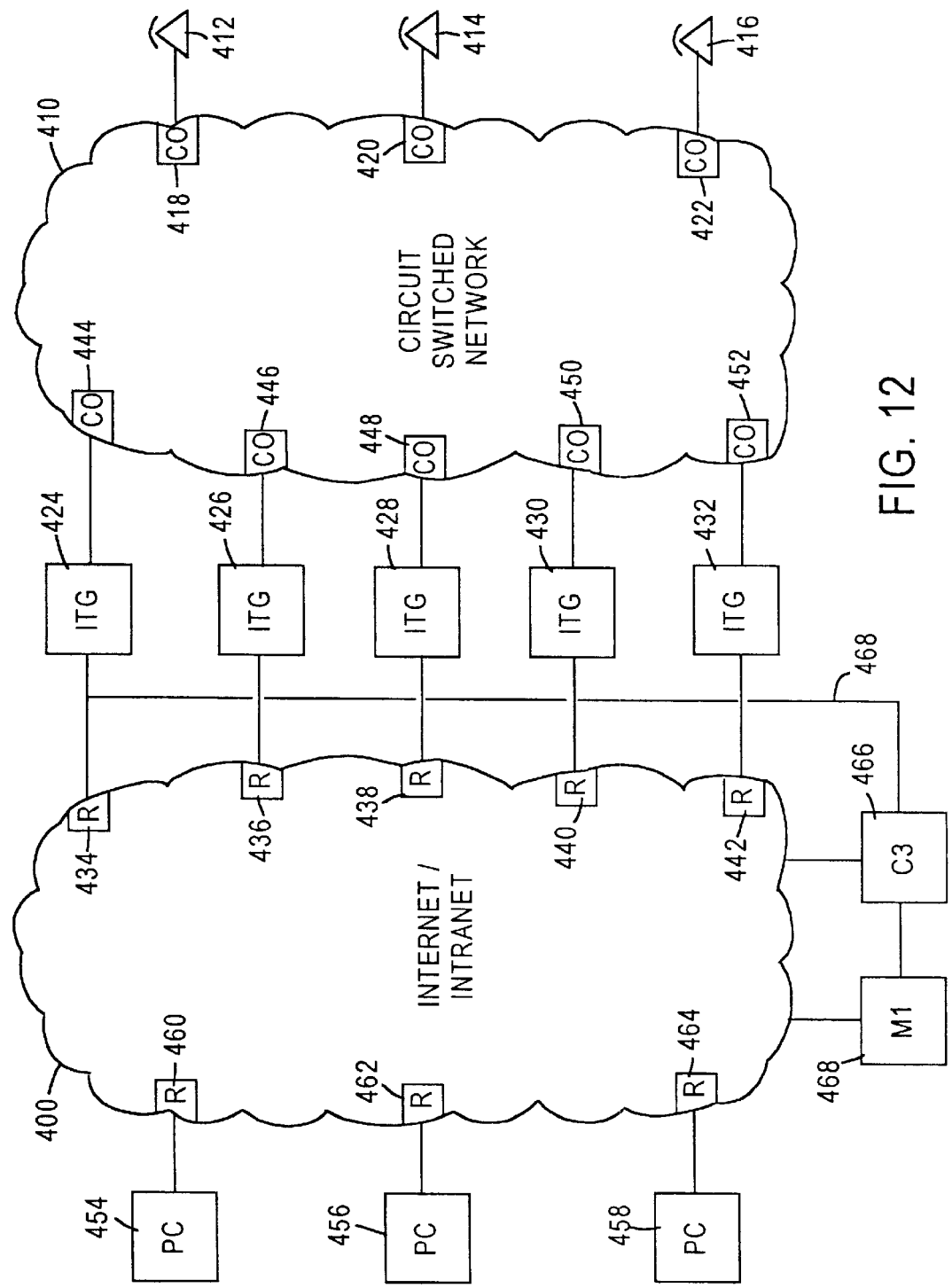
FIG. 12 is a simplified diagram illustrated another aspect of the invention showing an architecture wherein a separate intermediary information server provides substantially real time retrieval of account information across the entire communication system.

FIG. 12 provides a simplified illustration of this aspect of the overall communication system. Referring to that figure the IP Routed Internet/Intranet is shown at 400. The Circuit Switched Network, such as a public switched telephone network, is shown at 410. The circuit switched network serves a large number of subscriber terminals, here illustrated as telephone terminals 412, 414, and 416. The telephone terminals may typically be connected to the circuit switched network via end offices or central offices 418, 420, and 422 via local links or loops. It will be appreciated that these terminals may be distributed over a wide geographical area such as the entire United States of North America, by way of example.

The circuit switched network is connected to the packet switched network via a plurality of C2 call control objects or ITGs shown here by way of illustration as 424, 426, 428, 430, and 432. These gateway control objects are connected to routers in the Internet/Intranet as shown at 434, 436, 438, 440, and 442. The ITGs are also connected to end or central offices in the circuit switched network shown here as 444, 446, 448, 450, and 452. Also connected to the Internet/Intranet are voice equipped personal computers or PCs 454, 456, and 458. These PCs are shown connected to routers 460, 462, and 464. It will be appreciated that the particular gateway or ITG chosen to effect a particular communication path is dependent upon multiple factors, such as the lowest cost connection through the telephone network, by way of example. Thus the ITG 424 may be chosen to effect a link between PC 454 and telephone terminal 412.

As has been explained, the gateway controllers are all linked to the C3 authentication, usage and account object 466 as shown here at 468. The authentication, usage and account object in turn is linked to the information server object M1, here shown at 468. This has previously been described in more detail in connection with FIGS. 4, 5, and 6 hereinabove.

It is believed that this simplified diagrammatic illustration in FIG. 12 will facilitate an appreciation of the power of the authentication, usage, and account object C3 acting in conjunction with the information server M1. The arrangement permits the information server to provide to users almost immediate access to information regarding accounts which may actually be locally stored in instances of the authentication, usage and account object dispersed over an enormous geographical area. Such flexibility permits travelers to access their accounts from hotel rooms, while their employers may also access those accounts from the home or any branch office of the business establishment.

Figure 13:
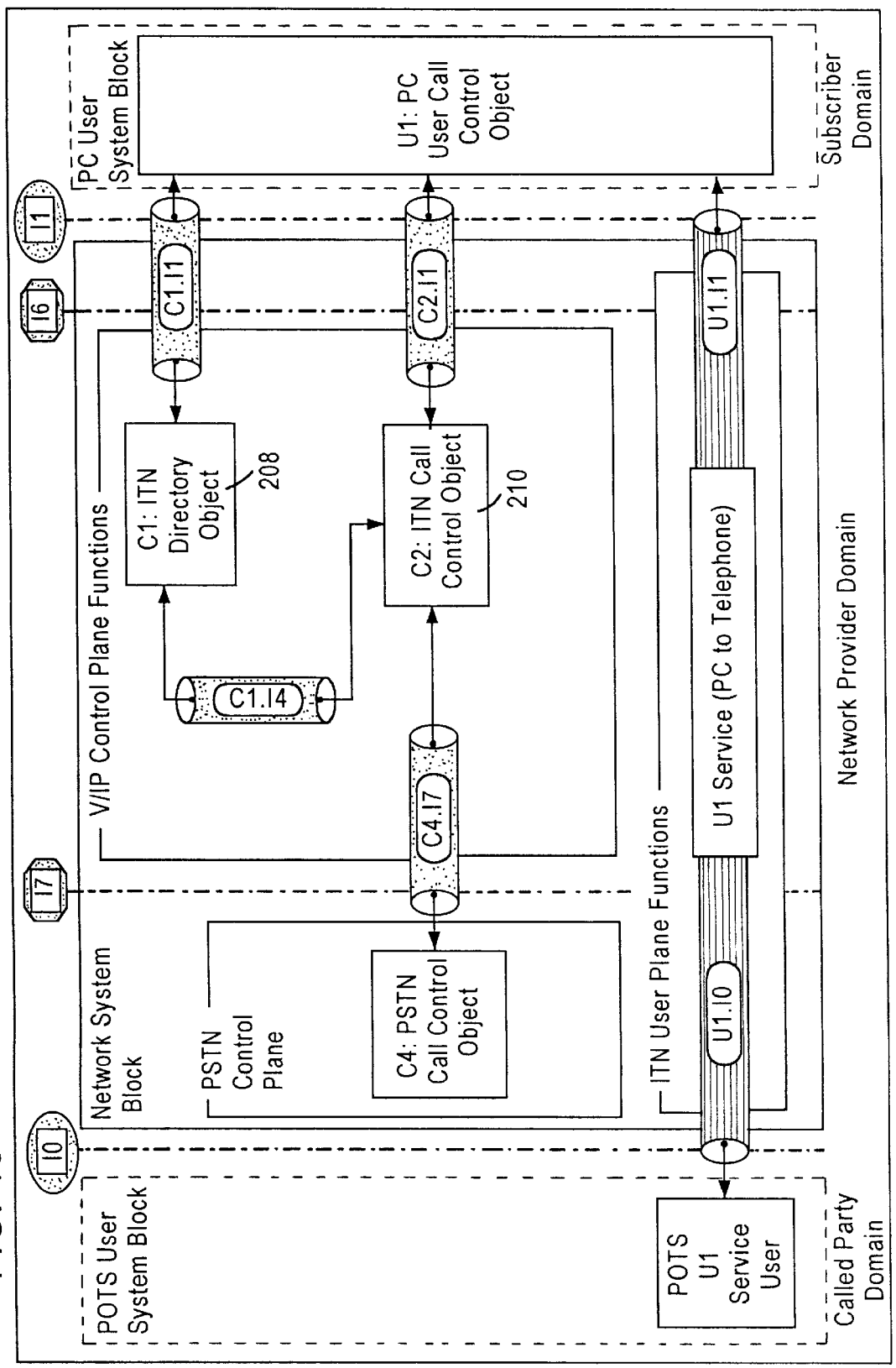
FIG. 13 is a diagram of another embodiment of the arrangement shown in FIG. 2 showing an additional new interface to assist in implementing choice of an optimal hop-off gateway.

Addressing now the question of improved gateway selection for managing a call across circuit switched and packet switched networks, there is shown in FIG. 13 an addition to the interface arrangement previously described in detail in relation to FIG. 2. FIG. 13 shows the C1 directory object which, in its enhanced implementation, will be queried in order to resolve which C2 gateway control object is to be chosen for setting up a particular call or communication path. C1.14 represents a new interface which will allow a directory system to acquire the state of multiple gateway control objects or ITGs in order to assess their current states and best distribute calls between them.

Figure 14:
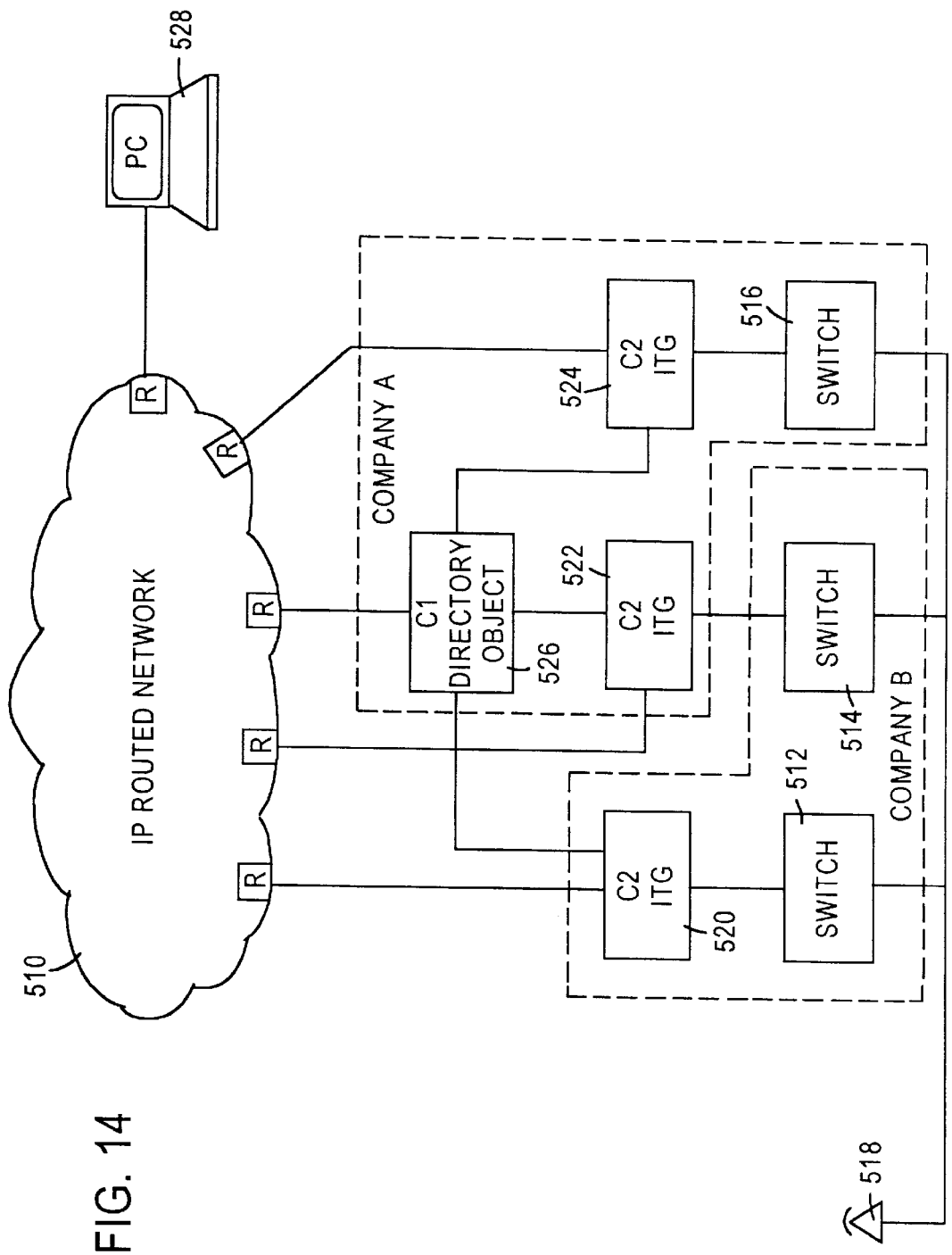
FIG. 14 provides a more global view of the architecture of the multi-gateway interface between the IP routed network and the switched telephone network.

Referring to FIG. 14 there is shown an expanded depiction of a circuit switched and packet switched network system illustrating multiple C2 gateway control objects or ITGs. The IP routed network or Internet/Intranet is shown at 510, while the circuit switched telephone network is represented by the central office or end office switches 512, 514, and 516, connected to a telephone terminal 518. The switches are connected to three C2 gateways of ITGs 520, 522, and 524. All gateways are connected to a C1 object directory 26 and to the Internet/Intranet 510. The directory 526 is connected to the Internet/Intranet 510 via an Internet/Intranet router R. All gateways 520, 522, and 526 are also connected to the Internet/Intranet 510 via routers R.

As shown in FIG. 14, the switch 516, gateway 524, and C1 directory object 526 are owned by company A, as indicated by the broken line. Switches 512 and 514 and gateway 520 are owned by company B. An illustrative laptop computer 528 is connected to the Internet/Intranet via a router R. The connection between the company A owned C2 gateway or ITG 522 and company B owned switch 514, being an inter-carrier connection, may be a Feature Group D connection. On the other hand, the connections between C2 gateways or ITGs and switches, which are owned by the same company, may be PRI ISDN connections. These would include the connection between the ITG 520 and switch 512, owned by company B, and the connection between the ITG 522 and switch 516, owned by company A.

In a basic configuration the Internet Telephony Gateway Directory manages which E.164 addresses (telephone numbers) are served within the terminating footprint of a particular ITG. The management of the terminating footprint may be in the form of NPA-NXX ranges which relate to an IP address for a single ITG. When queried with a "called" telephone number by the PC Call Control Object, the C1 object returns the IP address of the Internet Telephony Gateway (ITG) that serves the called telephone number.

In a global sense there will be multiple directory objects owned by a plurality of companies serving different geographical areas, as well as serving overlapping and/or the same area. These distributed directory objects may be linked together in a hierarchical relationship to be subject to interrogation by other directories so as to enable a system wide gateway address search. For this purpose the distributed directories may be considered to constitute a unitary logical object in the manner described for the C3 authorization, usage and control object.

According to this feature of the invention direct signaling between the directory object and gateways is enabled. This permits the directory to query the gateways as to their status, the current availability of ports, the available bandwidth, the possibility of bandwidth and/or route reservation, costs, and other operational capabilities. The directory is able to monitor gateway capabilities and availability, to query as to specific calls, and to arrange reservations in real time. In view of the fact that gateway owners are providing availability to the gateways for profit, it is in the interest of the owner to furnish maximum information and even to advertise the capabilities of their facilities. When this new directory to gateway signaling interfact is coupled with the capabilities of the enhanced directory object it makes possible the fulfillment of a large variety of the previously outlined objectives. As will be described in further detail, the directory object of the invention presents enhanced capabilities for implementing optimal gateway and routing selection.

Figure 15:
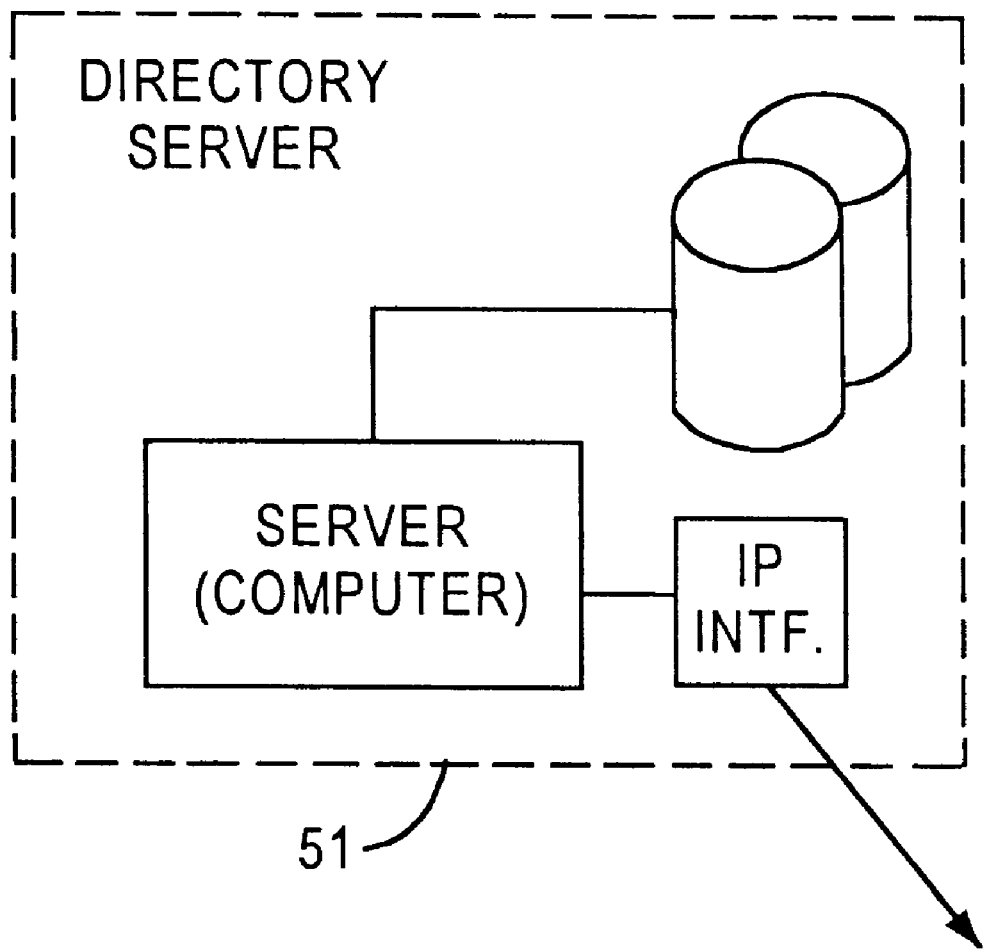
FIG. 15 is a simplified block diagram of a directory server computer which functions as the central processing unit of one preferred embodiment of an enhanced directory object for use in a combined circuit switched and packet switched telephony communication system.

Referring to FIG. 15, the enhanced directory server 51 comprises a server computer which functions as the central processing unit of the directory server. The computer has an IP packet data interface to the Internet/Intranet 510 as shown by the connection to the C1 directory object in FIG. 14. The directory system 51 also includes a data storage system storing a series of databases attached to or incorporated into the server. As discussed more below, the databases include look-up tables for direct translations of called party telephone numbers and/or addresses to gateway addresses and routing control records for conditional processing of requests for communication.

Essentially, when a user wishes to initiate a telephony communication, they instruct their PC to start communication using a telephone number address, such as by populating the telephone number field in their V/IP software application ask previously described. This software application invokes the Directory (C1 Object) to obtain the IP address of the destination ITG. Based on the telephone number submitted by the PC application, and on the identity of the calling terminal, and on any specific requests or handling conditions specified, the directory server 51 reacts and responds. Assuming authorization from the C3 authorization object, the directory object or server may execute a direct look-up table based translation to a gateway IP address. However, for any subscriber customer who has established more detailed routing requirements, the directory object server 51 will execute conditional analysis in response to the query from the directory object.

In its simplest form, if the conditional analysis produces a first result, the directory object server translates a telephone number included in the query into a first gateway or ITG IP address. If the conditional analysis produces a second result, the directory object server translates the name included in the query into a second gateway IP address. The server then transmits a response message containing the first or the second destination address to the calling PC. The PC uses the received gateway IP address to proceed through the previously described authentication procedure and establish the desired communication through the public packet data network.

Figure 16:
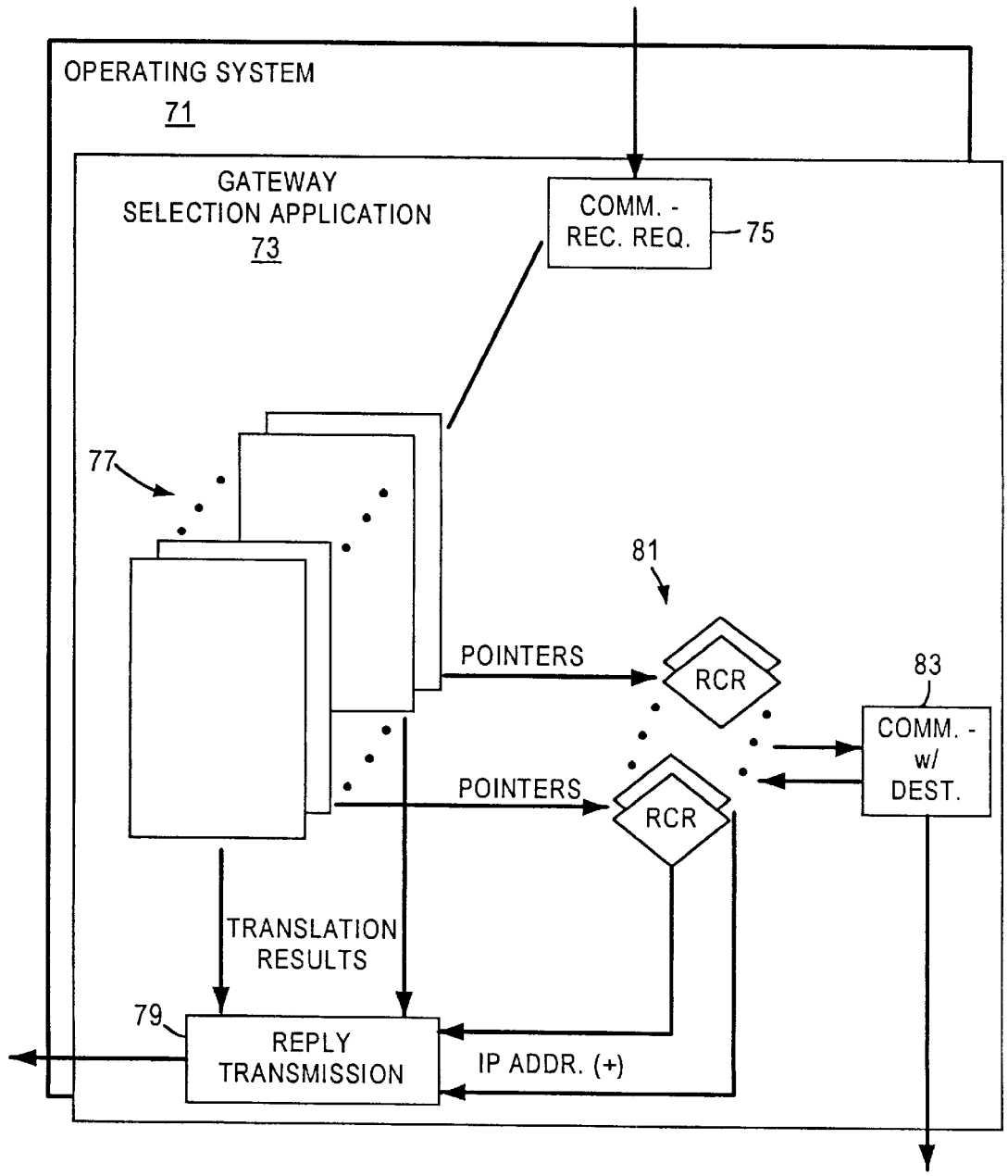
FIG. 16 diagrammatically illustrates one possible organization of the software for the enhanced directory object of FIG. 15.

FIG. 16 provides a simplified illustration of an example of one possible organization of the software for the directory server 51, for implementing the enhanced operations as described in one embodiment in the above referenced Voit application Ser. No. 08/812,075. The computer of the enhanced directory server runs a standard operating system 71, such as UNIX. The operating system facilitates execution of one or more applications. One of the applications that will run on the computer of the directory server 51 is a gateway selection application 73. The gateway selection application 73 includes executable code facilitating the actual processing. The executable code permits access to both translation tables and routing metrics 77 as well as routing control records (RCRs) 81 stored in a database within the storage system portion of the directory server 51. The executable code of application 73 may also trigger several communication routines 75, 79 and 83.

More specifically, when the computer of the directory server 51 receives a 'query' or request for gateway selection, the operating system 71 passes the request from the IP interface to the communication routine 75 of the application 73. The communication routine extracts the appropriate information from the query message, such as the address of the requesting terminal device and the name that the address or telephone number of the terminal device which has been identified for connection. The communication routine may also extract any commands as to routing which the caller specifies. These may include least customer cost routing, reservable routing, specified bandwidth routing, specified carrier routing, or the like.

The gateway selection or directory processing application 73 can access a series of translation tables as well as routing metrics 77. Some of the tables will simply translate called numbers into IP addresses of the most proximate gateways having a footprint which includes the number. The routing metrics are routines or methods by which routing algorithms determine that one route is better than another. This information is stored in tables which may include reliability, delay bandwidth load, maximum transmission units (MTUs), communication costs, hop count, available ports, reservability, and the like.

The product of the translation or routing metric will result in an IP address. The directory processing application 73 will supply the resulting IP gateway address and any related instructions or commands produced by the operation to a communication routing 79 for transmission of a reply message to the terminal device that requested the translation. The application 73 also provides the address of that terminal device to the reply transmission routine 79. In response, the routine 79 will formulate an IP reply message containing the terminal device address as the destination address and containing the IP address produced by the translation process as message data. The reply transmission route 79 forwards the message through operating system 71 and the IP interface for transmission through the public packet data network or Internet/Intranet to the requesting terminal device. The requesting terminal device then initiates the desired communication using the gateway address.

Certain parties or customers will desire and subscribe to a variety of routing services requiring conditional analysis type processing. For each of those customers, the directory server will store a routing control record (RC) 81. For each number associated with such a customer, the translation tables 77 will store a pointer pointing to the routing control record (RCR) 81 that controls that customer's routing service.

The directory processing application 73 will receive a query in the manner discussed above. However, when the application accesses the translation table with the number associated with a customer having conditional analysis based service, the translation will return a pointer identifying the controlling RCR. The directory processing application 73 then executes a conditional analysis routine utilizing the identified RCR 81. The conditional analyses defined by the RCRs vary considerably, depending on the customized routing service selected by each customer. In the simplest form, the RCR specifies a set of conditions or criteria and two or more alternate procedures, depending on which criteria are satisfied by the current call or directory request query. For example, the RCR may specify alternate procedures for different times, or for different addresses of the terminal which the customer used to request the translation. In these cases, the directory processing application 73 compares call or query related parameters to the criteria in the RCR 81 and obtains the gateway destination address corresponding to the parameters of the current call or translation query.

FIG. 14 depicts a single directory server 526, and the above discussion has concentrated on a single server implementation for ease of explanation. In an actual, large scale deployment, the directory server system would comprise a number of server systems 526 in a hierarchical arrangement. Each domain name server 526 would serve a region or segment of the public packet data network or Internet/Intranet and would provide translations and conditional analysis processing of numbers corresponding to addresses residing within the segment served. Any computer or PC on the segment requesting translation would first query the directory server system 526 serving that segment. If the number was not one associated with that server, the directory server 526 would communicate through the hierarchy of such servers to relay the query to the appropriate server for processing; and after processing, that server would provide the destination gateway address and any associated information in the reply back to the querying device. Also, each directory server 526 in a given area could be duplicated, for redundancy.

It should be noted that any number of useful telecommunications functions can be performed by controlling the IP address and/or other routing information returned as a result of the conditional analysis performed by the directory server. The IP address and/or other routing information returned to the caller is determined by customized routing control records (RCRs) stored in a database in the directory server 526. These routing programs can provide a wide range of customized routing services, in a manner similar to the services provided by call processing records used in the AIN telephone network.

Figure 17:
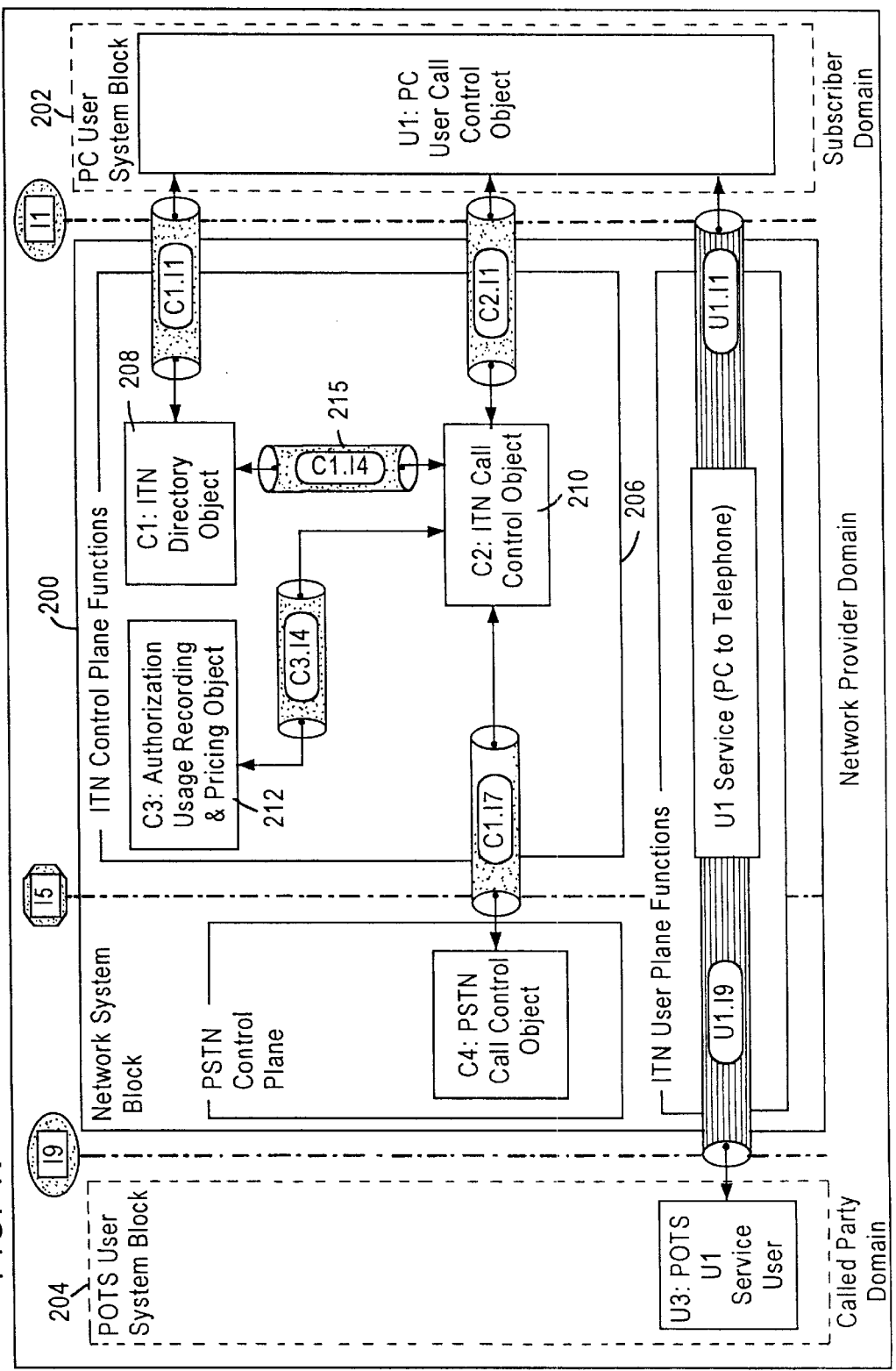
FIG. 17 is a diagram of another embodiment of a preferred architectural implementation showing interfaces between IP network elements.
Figure 18:
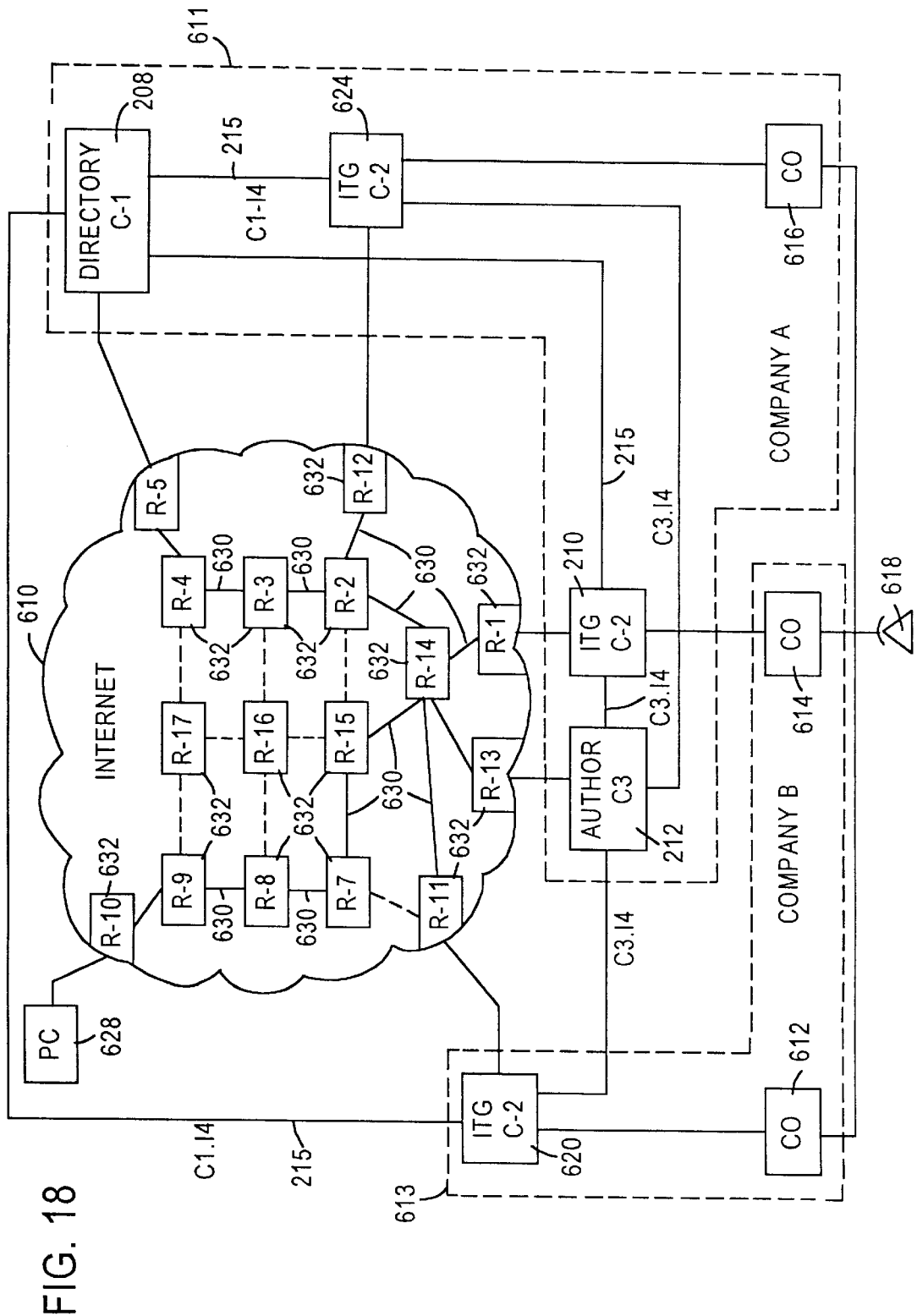
FIG. 18 provides a more global view of the architecture of the multi-gateway interface between the IP routed network and the switched telephone network using the interface architecture of FIG. 17 to provide varied qualities of IP through-put.

Referring to FIGS. 17 and 18 there are shown architectures of another preferred implementation of the invention. This version of the invention is directed to providing a predictable and guaranteed quality of service to the user. Generally speaking the parameter most in need of control is bandwidth. Many Internet users access the Internet using a modem connected to a standard analog telephone line. Such service is known as Plain Old Telephone Service, or POTS. Modems used on POTS lines reach their data transfer limit around 30 kbps without compression. With compression, data transfer rates can be as great as 60 kbps.

Such bandwidth is adequate for real-time audio communication, but a poor solution for applications requiring higher throughput, such as video. As a result, services such as ISDN are becoming popular for applications demanding a connectivity bandwidth above that obtainable from conventional modems. As an approximation the applicability of available Internet connections may be illustrated as follows:

| | | |
|---|---|---|
| POTS | 28.8 kbps | Audio/FM mono quality |
| ISDN-BRI | 144 kbps | Audio/FM stereo quality Low end video |
| ISDN-PRI | 1.544 mbps | Audio/CD quality Video |
| T-1 | 1.544 mbps | Audio/CD quality Video |
| ATM | 622.0 mbps | Audio/CD quality Video/broadcast quality Virtual reality applications |

The Internet itself does not present a completely uniform bandwidth transmission medium. Originally the National Service Foundation (NSF) funded a 56 kbps network linking the five original supercomputer centers, and offered to let any of the regional and university computer centers that could reach this network to connect to it. This was the genesis of the Internet network which is known today and the original reason to connect was to access the supercomputer facilities remotely. This occurred and traffic rose dramatically.

In 1987 NSF funded an upgrade of the backbone using 1.544 mbps T1 leased lines connecting six regional networks including the five existing supercomputer centers. This upgraded and expanded network replaced the old NSF 56 kbps network. This NSF network was in turn upgraded by a private non-profit network organization to a 45 mbps T3 backbone to which thousands of smaller networks connected. The Internet was largely defined by having connectivity to this NSFNet backbone. This network was in turn superceded by the present Internet comprised of a series of Network Access Points (NAPS) where private commercial backbone operators can interconnect, much as with the NSFNet backbone. In this way there developed the current approximately eleven major interconnection points, three official NAPs, three historical NAPs, and five defactor NAPs.

Any national backbone operator that has peer connection at one or more of these interconnects has some connectivity to the Internet. At this point most backbone operators are cross connecting with other backbones at virtually any location of convenience. The trend is presently toward ATM technology for NAP backbones permitting broadband access at speeds of up to 36 mbps for T3 access and up to 139 mbps for OC3 access. ATM services are offered using permanent virtual circuits (PVS) and later switched virtual connections (SVC). The difference is that PVCs appear as point to point or point to multipoint, and must be set up ahead of time through a provisioning process, whereas SVCs are dynamic. The NSF sponsors a Routing Arbiter service at each NAP. Clients may make arrangements with the routing arbiter for dissemination of routing information among participants in the service. The high speed T3 backbones which connect to major metropolitan areas are extended to surrounding communities via less expensive 1.55 mbps lines. These lines may extend to even further points with even less expensive 56 kbps leased lines. Generally all nodes of the network owned by the national service provider are referred to as Points of Presence (POPs). Business customers then lease their own telephone line from the telco to the PO and so connect to the Internet.

Referring to FIG. 17 there is seen a depiction of the combined interfaces previously shown and discussed in connection with FIGS. 2 and 13. Thus FIG. 17 shows at 202 the PC user System Block in the subscriber domain, at 200 the Network System Block or network provider domain, and at 204 the POTS User System Block or called party domain. Within the Network System Block the ITN Control Plane functions are illustrated at 206. The ITN Control Plane functions are those which establish and tear-down communication paths across the User Plane. Three Control Plane Objects are illustrated, namely: C1 the Internet Telephony Gateway Directory Object, C2 The Internet Telephony Call Control Object, and C3 The Internet Telephony Authorization and Usage Recording Object.

These objects are shown respectively at 208, 210, and 212. As previously described, the C3 object represents the network element required in this architecture to perform customer authentication, call authorization, usage accounting, and usage pricing for a particular PC user's customer account. The C3 object is invoked during a call when an Authorization request is relayed over the interface C3.I4. This interface is responsible for allowing an authorization of ITG usage by a service subscriber, and for maintaining the current state of a subscriber's connections within C3, as well as passing ITG generated usage records from C2 to C3 in real time.

The C2 Call Control Object, which comprises the ITG, communicates with the PC user to establish a PC-to-Telephone call. It is the C2 Object or Call Control Object which coordinates the signaling among the involved network elements. Included in such signaling are management of the state of the call with the client PC software (via C2.I1 shown in FIG. 5), validation of a PC users' Account number and password (via C3.I4 shown in FIG. 6), establishment and tear down of the PSTN circuit (via C4.I7 shown in FIG. 5), generation of usage information which is sent for processing and pricing (via C3.I4 shown in FIG. 6), and managing the state of the connection within C3 (via C3.I4 shown in FIG. 6). The C1 object, the Internet telephony gateway Directory, manages which E.164 addresses (telephone numbers) are served within the terminating footprint of a particular ITG. In its basic configuration, the C1 object returns the IP address of the Internet Telephony Gateway (ITG) that serves the called telephone number when queried with a "called" telephone number by the PC Call Control Object or calling PC. In the enhanced configuration described in connection with FIGS. 13–16, the directory C1 is interfaced to the ITG call control object C2 via the interface C1.I4 shown at 215 in FIG. 17. Direct signaling between the directory object and gateways is enabled. This permits the directory to query the gateways as to their status, the current availability of ports, the available bandwidth, the possibility of bandwidth and/or route reservation, costs, and other operational capabilities. The directory is able to monitor gateway capabilities and availability, to query as to specific calls, and to arrange reservations in real time.

According to this embodiment of the invention the directory C1 is provided in its enhanced form as shown and described with respect to FIGS. 15 and 16. The directory object is owned by an entity, typically a Telco, who offers subscriptions to resource reservation. Optimally the entity which owns the directory object also owns the authentication, pricing, and usage database object C3. The owning entity stores in the enhanced directory tables of algorithms which include routing algorithms wherein specific quality or bandwidth is specified. In the instance of supplying subscribed resources, the enhanced directory stores algorithms of reserved or guaranteed routes specified by the subscribers. It is a feature of this embodiment of the invention that guaranteed routes may be supplied to non-subscribers on an impromptu basis. In this situation the enhanced directory may store a plurality of algorithms of routes which the owning entity can control and readily establish either by ownership or by contract. In utilizing the directory in this manner the specifications of the parameters of the communication path are being imposed at the originating rather than the terminating end. This is in contrast to the conditional routing previously discussed. Such routing typically is based on conditions specified by the destination terminal. In the present embodiments the conditions are specified by the originating terminal or negotiated by the originating terminal.

Referring to FIG. 18 there is shown a simplified diagrammatic illustration of a hybrid circuit switched-packed switched network or system having an architecture for implementing this embodiment of the invention. The packet switched network, such as the Internet, is diagrammatically shown at 610 as comprising a series of routers R. The telecommunications system, or circuit switched network, is diagramatically shown as a comprising a pair of telco's designated company A and company B. By way of example, the two companies may be regional operating companies 611 and 613. Telco A at 611 is represented by the single switch or central office 616, while telco B at 613 is represented by a pair of switches 612 and 614. All of the switches are shown as connected to a representative telephone terminal 618.

In this example the telco A owns and operates an enhanced directory C1 object 208, a call control ITG C2 object 210, and an authorization, usage recording, and pricing C3 object 212. It will be noted that these objects bear the same reference numerals as the C1, C2 and C3 objects shown and described with respect to FIG. 17 and FIGS. 2–6, and the prior description of the arrangement in those Figures is applicable. Thus the C1, C2, and C3 objects are interfaced by the interfaces C3.I4 and C1.I4. The C1 and C2 objects are also interfaced to the PC user call control U1 object by interfaces C1.I1 and C2.I1, and to the PSTN by interface C1.I7. These connections or interfaces will be recognized to represent logical connections and that the communication between the various objects comprises packet communication via the Internet or intranetwork 610. Company A also owns ITG or call control C2 object 624 which is shown connected to the CO or end office switch 616.

A particular aspect of this embodiment of the invention is the use of dedicated virtual paths established in the Internet to maintain a prescribed service level, i.e., quality of service, for the party which establishes the call, i.e., the calling party. Specifically, the Internet 610 includes a plurality of routers R that route data packets along any available paths, here shown as broken lines, based on known algorithms. As known in the art, the separate packets that constitute a message may not travel the same path depending on traffic load. However they all reach the same destination and are assembled in their original order in a connectionless fashion.

In order to provide guaranteed service quality, typically during long distance telephone calls via the Internet, the data packets can be transported on dedicated virtual paths at a minimum guaranteed bandwidth and latency, for example 28.8 kbps per telephone call in each direction. As illustrated in FIG. 18 such virtual paths are shown as solid lines 630. Such paths may be used for large-scale transport of packets carrying long distance traffic to different telephone networks.

FIG. 18 shows two telco networks respectively belonging to Company A and to Company B. The illustrated destination nodes or routers for Company A comprise R-12 for ITG 624 and R-1 for ITG 210. The illustrated destination node for Company B comprises R-11 for ITG 620. It will be understood that many more such destination nodes and ITGs may exist. The terminal indicated as PC 628 may be representative of one of a number of such terminals connected to a LAN connected to node R-10. This LAN may in turn belong to a business enterprise desiring to insure a specified quality of voice connection via the Internet to these three Points of Presence (POPs) R-11, R-1, and R-12 for the two telcos.

This LAN customer may utilize the directory C1 208 of Company A, which may own the routers R-1 and R-12. Company A may also own the router R-14 which it uses as a hub for permanently maintained virtual circuits. The LAN customer 628 may contract with Company A to reserve an OC-1 (51.84 mbps) bandwidth path from its node of connection R-10 to each of nodes R-1 and R-12, as well as to node R-11. These paths are reserved by PC (or LAN) 628 for calls originating in the LAN. Company A, which owns and operates the directory 208, accordingly stores in the database of that directory a reservation of such routing. This is shown, by way of example, in the first three line entries in the table illustrated in FIG. 19. At any time that a call originates from PC 628 to a telephone terminal for which the destination node is R-1, R-12, or R-11, the address database in the directory will be directed to the table of FIG. 19, which will indicate that the call is entitled to use this OC 1 bandwidth reservation. The call will be routed by the directory to the appropriate destination node and ITG with the specified bandwidth. Company A will insure that the bandwidth reservation also appears in a similar table in the source router or node R-10. The prescribed paths are then established through the intermediate nodes to the destination nodes R-1, R-12, and R-11, respectively.

While the connections between the C2 ITGs and the C1 directory have been shown as logical connections for ease of illustration, it will be recognized that these communication paths in fact comprise routes through the packet switched network. Since the owner of the directory will seek a high volume of usage it will seek to provide maximum availability for the facility. To this end the directory owner may provide high capacity communication paths for frequent users of the directory. Thus FIG. 18 illustrates a virtual path from such a potential user as ITG 620 which is connected to node R-11. This path is shown as extending through intermediate nodes to destination node R-5 for the directory 208. This path is shown in the table of FIG. 19 as specifying an OC-3 reservation. Any attempt to reach the directory 208 from ITG 620 will result in the directory specifying the availability of the OC-3 capacity.

For similar economic reasons Company A will desire that the directory be available to its own customers with equal facility. Accordingly OC-3 virtual circuits rate in a communication link should be changed. If the directory determines that a virtual path has little traffic, then the directory may specify a higher data rate for the communication link. However, if the directory determines that a large amount of traffic exists on the virtual path, then the data rate may be reduced to the minimum guaranteed service level stored in the directory database for the calling number. The interface C1.I4 between the directory C1 and the call control object gateway C2 (ITG) enablers this capability and permits the enhanced directory to determine the state of the IP network before establishing virtual routing in specified bandwidths.

An alternate arrangement for providing a communication link according to a prescribed service level involves using Internet Protocol, version 6 (IPv6). IPv6 incorporates a variety of functions that make it possible to use the Internet for delivery of audio, video, and other real-time data that have guaranteed bandwidth and latency requirements. Hosts can reserve bandwidth along the route from source to will be reserved from ITGs 210 and 624, as also shown in the table of FIG. 19. It will be appreciated that while the table in FIG. 19 carries only the listing of one customer of Company A, namely PC 628, this is intended to be merely illustrative of all customers of Company A which choose to reserve bandwidth. Likewise, while the discussion has been in terms of voice circuits, it should be appreciated that higher bandwidth services, such as video or multimedia, are equally accommodated by providing the requisite bandwidth virtual paths. In most instances the virtual circuits will utilize only a portion or percentage of the available path capacity.

Once the sequence of routers has been established for a virtual path, the end-to-end virtual path is stored as a virtual path lookup table in the C1 directory database, along with the total available bandwidth. The C1 directory 208 also monitors unused bandwidth when allocating bandwidth for each routing request. Hence, the C1 directory 208 is able to monitor traffic along a virtual path to determine whether a data destination. Hosts can specify loose or strict routing for each hop along a path. In addition, packets are assigned a priority level, ensuring that voice or video transmission is not interrupted by lower priority packets. Signaling information between the ITGs and between an ITG and the directory object will typically be given highest priority. Service levels for subscribers at calling stations are typically arranged at different levels, depending on subscriber preference and cost. Once a service level for a subscriber is established, the guaranteed service level is stored in the C1 directory object database.

In addition to the ability of the enhanced directory to store subscriber reservations it may also be utilized to store negotiating programs or applications for negotiating a routing of the desired quality through the Internet on a per call basis. Listings of preferred routers for use form specific ITGs may be maintained on the basis of prior arrangements which have been made by the owning entity. The actual negotiation of the routing may be from the calling PC under the control of a program or routing downloaded from the directory. Alternately, the route may be negotiated from the ITG pursuant to communication between the ITG and the directory.

In addition to route and quality negotiation the directory database may provide a connection reservation service. A subscriber or network user may request the establishment of a routing of a specified quality of service for a specific time. In such service the directory may pre-arrange the routing and provide the caller with a reservation number. The caller may then initiate the call at the specified time and receive the pre-arranged routing and quality of service by simply providing the reservation number.

Different hop-off gateways may provide different services. As an example, one gateway may provide the ability to utilize the common channel signaling network of the involved telco's to determine the availability of the called terminal prior to setting up a routing. In this manner a connection could be guaranteed prior to proceeding with a routing determination, authentication, pricing, and authorization procedure. Another ITG may offer a rating service, such as either permitting or barring 976 or other specified calls. Still another ITG may provide high capacity as compared to an ITG which has a high percentage of busy time. All such information may be stored in the directory database and placed at the disposal of users of the directory and users of the particular ITGs. The directory may cooperate with the authentication, pricing and usage C3 object so that sufficient detail as to routing and facilities to be used may be provided to permit accurate pricing, authentication, and authorization.

Because of the hierarchical distributed nature of the directory it is possible for a directory with the most advanced offering of services to be sought by other instances of the distributed directory to satisfy the demand of their own subscribers. The enhanced directory may store large quantities of information as to the capabilities and services available from the various directory and gateway objects in order to provide highly flexible and varied services and thus attract usage and revenues.

An example of the operation of the embodiment of the invention shown in FIGS. 17–19 may be as follows:

The call flow starts at the point where the user has established IP layer connectivity with the network, and has invoked the V/IP software application. This preliminary procedure would typically entail the following steps by the party initiating the call.

1. The customer boots the PC, and connects to the IP network following his/her existing procedures for network access.
2. The customer will launch their V/IP application, and the application will present a template of fields which are required to initiate a call wherein special parameters are specified by the caller.
3. The customer will populate a "telephone number to be called" data field, an account number and password field (or the application may reapply this data if it has been previously saved within the application, and special parameter fields, such as, minimum band width for the call, maximum latency, reservation of the specified network capacity for a particular time, and other like parameters. The customer may also be making a particular call frequently wherein parameters for the call are specified in an RCR for the customer in the enhanced directory object, such as the directory object of FIGS. 15 and 16. In this event the customer may simply identify the desired communication path and parameters by number, name, or other characterization in an appropriate field.

4. The customer will the initiate the call. During the call, the call's cost status will be presented in real-time to the user by the application (via a visual display).

5. The user initiates a call via the PC's V/IP software. This software application presents the data in the populated fields to the Directory (C1 Object) to obtain the IP address of the hop-off ITG and any other information specified in the request as defined in the populated fields. Based on that information submitted by the PC application as described in the foregoing preliminary procedure, the C1 Object searches its storage of called numbers and accompanying parameters and ascertains the address or addresses of the gateway or gateways which have the capability to supply the connectivity being requested. The directory then engages in communication with one or more of those gateways to ascertain their immediate availability to provide the required service. This may entail a polling or gateways by the directory. As a result of its search of its own database and the information obtained from the gateway or gateways, the directory frames a response to the inquiry of the calling party.

6. The directory object thereupon returns to the calling party the IP address of the associated ITG (C2 Object) and any instructions necessary to establish the particular specified call.

7. The PC's V/IP software application involves the C2 Object to set up a call by passing to C2 the number to be called, the user's account number, a password and any necessary data for establishing the specified parameters in the packet switched network. This may include specification of specific nodes and specific node to node virtual circuits. It may also include negotiation of the desired parameters.

8. C2 invokes the C3 Authorization, Pricing, Authentication and Account Object in order to receive authorization to proceed with the call. This may entail communication among instances of the distributed database to verify the account status of the caller and optionally set a limit on the duration or cost of the call depending upon the account status and/or balance or set a reservation of a specified amount to be debited to the account. The pricing of the call may be communicated to C2 for communication to the caller. C3 will pass the authorization information back to the C2 Call Control or ITG Object.

9. If authorization was successful, C2 will establish the specified communication path through the packet switched network, establish the PSTN connection, and notify the client software that the call is proceeding. Alternatively the application in the calling PC may establish the routing through C2 relying on programming or routines supplied from C1 based on either the specified parameters in its associated database or based on parameters specified by the caller in the fields which have been populated. C2 may also pass on to the calling PC the pricing information obtained from C3. C2 will continue to update the client software with call establishment information as the call is proceeding and may also pass along to the caller a running account of the cost of the call.

10. After the call has been established, the PC will respond to the network that it recognizes that a connection has been established (Connection Acknowledged), timing of the call's duration can be initiated, and any usage measurements will indicate that the call is billable.

11. Steady state call (Voice Flow).

12. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down.

13. The C2 Object passes a usage record to C3 for reporting. The C3 Object may also initiate individual call billing by reporting to M3 as shown in FIG. 6.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A communication system providing telephony communication comprising:

circuit switched and packet switched networks connectable to terminals for selective communication between said terminals, a directory object interfaced with the packet switched network, and a plurality of gateway objects interfaced with the packet switched network and capable of communication with the directory object, which gateway objects provide selectable controlled hop-off connectivity for telephone communications between the circuit switched and packet switched networks, wherein responsive to a request for information for establishment of a communication path for a telephone communication, said directory object:

communicates with at least one of a group of the gateway objects that are potentially capable of providing a hop-off to reach an intended destination, to obtain information regarding substantially immediate availability of a resource to handle the telephone communication through the at least one gateway object to the circuit switched network, and transmits a response to said request identifying a selected one of the group of gateway objects for providing the hop-off to reach the intended destination, wherein the selection of the one gateway object by the directory object is based at least in part on the substantially immediate availability of the resource to handle the telephone communication at the at least one gateway object.

2. A system according to claim 1 wherein said directory object comprises a unitary logical object which is distributed.

3. A system according to claim 2 wherein said directory object includes processor capability and processes the status information obtained from said at least one gateway object pursuant to predetermined routines associated with said directory object.

4. A system according to claim 3 wherein at least one of said predetermined routines is selected at least partially on the basis of information obtained in said request.

5. A system according to claim 4 wherein at least a portion of said information obtained in said request comprises the identity of the requester and a quality of requested service parameter.

6. A system according to claim 5 wherein the selection of routines is based at least partially on information stored in said directory object in relation to the requester.

7. A system according to claim 1 wherein said directory object comprises:
- a server having a central processing unit and an interface coupled to the packet switched network,
- a data storage system accessible by the central processing unit; and
- software running on the central processing unit for processing a request for an address of a gateway object received via the interface between said directory object and said packet switched network to generate the response for transmission via said interface to said packet switched network,
- wherein the software controls the central processing unit to include in the response an address for the selected gateway object and routing information.

8. A communication system providing telephony communication, comprising:
- circuit switched and packet switched networks connectable to terminals for selective communication between said terminals,
- a directory object interfaced with the packet switched network, and
- a plurality of gateway objects interfaced with the packet switched network and capable of communication with the directory object, which gateway objects provide selectable controlled hop-off connectivity for telephone communications between the circuit switched and packet switched networks,
- wherein responsive to a request for information for establishment of a communication path for a telephone communication, said directory object:
- communicates with at least one of a group of the gateway objects that are potentially capable of providing a hop-off to reach an intended destination, to obtain information regarding substantially immediate availability of a port from each of said at least one gateway object to the circuit switched network to handle the telephone communication to the circuit switched network, and
- transmits a response to said request identifying a selected one of the group of gateway objects for providing the hop-off to reach the intended destination, wherein the selection of the one gateway object by the directory object is based at least in part on the substantially immediate availability of the port to handle the telephone communication at the at least one gateway object.

9. A communication system according to claim 1 wherein the information obtained from said at least one gateway object comprises information regarding bandwidth for said communication path available at each of said at least one gateway object.

10. A communication system according to claim 1 wherein said response includes routing information obtained from said directory object for routing communications through the packet switched network to the selected gateway object.

11. A communication system according to claim 1 wherein said response comprises information for use in communication through said packet switched network for establishing a communication path to the selected gateway object of a minimum quality specified in said request for information.

12. A communication system according to claim 1 wherein the directory object communicates with each gateway object in the group to obtain information regarding status of the each gateway object in the group, and selects the one gateway object for identification based on relative status of each gateway object in the group.

13. A communication system according to claim 1 wherein said directory object has stored in association therewith information regarding routing of communication paths via virtual connections between nodes in said packet switched network.

14. A communication system according to claim 1 wherein said communication path comprises a virtual connection through said packet switched network.

15. In a communication system providing telephony communication across combined circuit switched and packet switched networks connectable to terminals for selective communication between said terminals, and having a directory object interfaced with the packet switched network and having a plurality of gateway objects, which gateway objects provide selectable controlled connectivity for telephony communication between said circuit switched and packet switched networks, a method comprising the steps of:
- receiving in said directory object a request for an address of a hop-off gateway object for establishing a telephony communication path at least partially through said packet switched network to a specified destination terminal;
- identifying a group of the gateway objects potentially capable of providing a hop-off from the packet switched network to the circuit switched network to reach the specified destination terminal;
- communicating with at least one of the gateway objects of the group and obtaining information therefrom regarding respective status of the at least one gateway object, wherein the obtained status information comprises status of availability of a port to the circuit switched network on each gateway object of the group;
- selecting an optimum one of the gateway objects in the group based at least in part on the obtained status information regarding port availability; and
- transmitting from said directory object a response through said packet switched network, the response comprising an address of the selected gateway object for use in establishing a telephony communication path through said packet switched and circuit switched networks via the selected gateway object.

16. A method according to claim 15 wherein the obtained status information comprises status of availability of bandwidth at each of the gateways of the group.

17. A method according to claim 15 wherein said request comprises a selected minimum quality of service for the telephony communication path at least through the packet switched network.

18. A method according to claim 15 wherein the step of communicating and obtaining information comprises launching a query through the packet switched network to each of the gateway objects of the group and receiving a response containing the status information from one or more of the gateway objects in the group.

19. A method of communicating across a circuit switched network and a packet switched network connected by a plurality of gateway objects comprising the steps of:

transmitting to a directory object in said packet switched network a request for an address of a gateway object to establish a communication path between an identified requesting terminal and an identified destination terminal, said request including a parameter specifying the desired quality of service through the packet switched network comprising a guarantee of connection;

communicating between said directory object and a plurality of said gateway objects to determine a resource status relating to availability of connection to the circuit switched network at each of the plurality of gateway objects;

selecting one gateway, through which said desired quality of service may be satisfied, from the plurality of gateway objects, based at least in part on the resource status relating to availability of connection of each of the plurality of gateway objects;

transmitting an address of the selected gateway object to the identified requesting terminal; and establishing a communication path between the identified requesting terminal and said destination terminal which satisfies the desired quality of service through the selected gateway object.

20. A method according to claim 19 wherein said establishing of a communication path comprises signaling between the selected gateway object and one or more nodes in said packet switched network.

21. A method according to claim 20 wherein said signaling between said selected gateway object and said one or more nodes in said packet switched network initiates the establishment of a virtual connection between at least a pair of nodes in said packet switched network.

22. A method according to claim 20 wherein said signaling between said selected gateway object and said one or more nodes in said packet switched network is at least partially under the control of the the identified requesting terminal.

23. A method according to claim 22 wherein said control by the identified requesting terminal is based at least partially on information obtained from said directory object.

24. A method of communicating across a circuit switched network and a packet switched network connected by a plurality of gateway objects comprising the steps of:

transmitting to a directory object in said packet switched network a request for an address of a gateway object to establish a communication path between an identified requesting terminal and an identified destination terminal, said request including a parameter specifying the desired quality of service through the packet switched network, the desired quality of service including a guaranteed reservation of establishment of said communication path;

communicating between said directory object and a plurality of said gateway objects to determine a resource status of each of the plurality of gateway objects;

selecting one gateway object, through which said desired quality of service may be satisfied, from the plurality of gateway objects, based at least in part on the resource status of each of the plurality of gateway objects;

transmitting an address of the selected gateway object to the identified requesting terminal; and establishing a communication path between the identified requesting terminal and said destination terminal which satisfies the desired quality of service through the selected gateway object.

25. A method according to claim 24 wherein each resource status of a gateway object includes the substantially immediate availability of a port in a respective gateway object.

26. A method according to claim 24 including the steps of identifying an account for said requesting terminal and ascertaining that the identified account has a balance satisfactory for covering the cost of the requested communication.

27. A method according to claim 24 including the steps of identifying an account for said requesting terminal, ascertaining the balance in said account, and establishing limits for the use of the requested communication path based on said balance.

28. A method according to claim 24 including the steps of identifying an account for said requesting terminal, reserving a portion of the amount in the identified account prior to initiating establishing said communication path, and releasing said reserved amount and debiting the identified account of the calling terminal upon termination of usage of said communication path.

29. A directory object comprising:

a programmable processor;

a memory, coupled to the processor, for storing translations;

a network interface, coupled to the programmable processor, for enabling the directory object to send and receive messages via a packet switched network; and a program comprising code for execution by the processor, wherein execution of the program by the processor causes the directory object to:

receive from an originating device a message requesting a translation to identify a telephony gateway from among a plurality of telephony gateways coupled between the packet switched network and a circuit switched telephone network, the request message comprising an identification of an intended destination;

access a translation in the memory to identify a group of the telephony gateways that may provide hop-off service from the packet switched network for telephony communication through the circuit switched telephone network to the intended destination;

launch a query through the packet switched network to each telephony gateway in the group requesting status as to substantially immediate availability of a resource of each respective telephony gateway for handling a telephone communication to the circuit switched telephone network;

receive a response through the packet switched network from at least one telephony gateway in the group containing information regarding availability status of the requested resource for handling the telephone communication;

select one telephony gateway from the group based at least in part on the received information regarding availability status of the requested resource for handling the telephone communication; and transmit a response message to the originating device, the response message comprising routing information for initiating the telephone communication via the selected telephony gateway through the packet switched network.

30. A directory object as in claim 29, wherein the received information regarding resource status relates to availability of at least one port to the circuit switched telephone network on a respective telephony gateway.

31. A directory object as in claim 29, wherein the received information regarding resource status relates to bandwidth availability at a respective telephony gateway.

32. A directory object as in claim 29, wherein: the request message further comprises a parameter value relating to a desired quality of service; and the directory object selects the one telephony gateway based at least in part on the received information regarding resource status indicating that the one telephony gateway can satisfy the parameter value relating to a desired quality of service.

33. A directory object as in claim 32, wherein: the parameter value relating to a desired quality of service comprises a request for a guarantee of connection, and the received information regarding resource status indicates that the selected telephony gateway can guarantee the connection.

34. A software product, comprising:

a computer readable medium; and a set of executable instructions contained on the medium for execution by a directory server computer system coupled to send and receive messages via a packet switched network, wherein execution of the instructions by the directory server computer system causes the directory server computer system to perform the following steps:

receive from an originating device a message requesting a translation to identify a telephony gateway from among a plurality of telephony gateways coupled between the packet switched network and a circuit switched telephone network, the request message comprising an identification of an intended destination;

access a translation in memory associated with the directory server computer system to identify a group of the telephony gateways that may provide hop-off service from the packet switched network for telephony communication through the circuit switched telephone network to the intended destination;

launch a query through the packet switched network to each telephony gateway in the group requesting status as to substantially immediate availability of a resource of each respective telephony gateway for handling a telephone communication to the circuit switched telephone network;

receive a response through the packet switched network from at least one telephony gateway in the group containing information regarding the substantially immediate availability of the requested resource for handling the telephone communication;

select one telephony gateway from the group based at least in part on the received information regarding resource availability; and transmit a response message to the originating device, the response message comprising routing information for communication with the selected telephony gateway through the packet switched network.

35. A software product as in claim 34, wherein the received information regarding resource status relates to availability of at least one port to the circuit switched telephone network on a respective telephony gateway.

36. A software product as in claim 34, wherein the received information regarding resource status relates to bandwidth availability at a respective telephony gateway.

37. A software product as in claim 34, wherein: the request message further comprises a parameter value relating to a desired quality of service; and the selection of the one telephony gateway is based at least in part on the received information regarding resource status indicating that the one telephony gateway can satisfy the parameter value relating to a desired quality of service.

38. A software product as in claim 37, wherein: the parameter value relating to a desired quality of service comprises a request for a guarantee of connection, and the received information regarding resource status indicates that the selected telephony gateway can guarantee the connection.

* * * * *